US006847974B2

(12) United States Patent
Wachtel

(10) Patent No.: US 6,847,974 B2
(45) Date of Patent: Jan. 25, 2005

(54) METHOD AND APPARATUS FOR INTELLIGENT DATA ASSIMILATION

(75) Inventor: David C. Wachtel, Pacific Pailisades, CA (US)

(73) Assignee: US Search.Com INC, Los Angeles, CA (US)

(*) Notice: Subject to any disclaimer, the term of this patent is extended or adjusted under 35 U.S.C. 154(b) by 63 days.

(21) Appl. No.: 09/916,243

(22) Filed: Jul. 25, 2001

(65) Prior Publication Data

US 2002/0194181 A1 Dec. 19, 2002

Related U.S. Application Data

(60) Provisional application No. 60/278,930, filed on Mar. 26, 2001.

(51) Int. Cl.[7] .............................................. G06F 17/30
(52) U.S. Cl. ..................... 707/101; 707/104.1; 707/100; 707/3; 715/513; 715/500.1
(58) Field of Search ................................. 707/100, 101, 707/104.1, 6, 3, 9, 10, 103; 715/513, 500.1; 709/202, 231, 232, 217, 220; 717/144, 114, 149

(56) References Cited

U.S. PATENT DOCUMENTS

| | | | |
|---|---|---|---|
| 5,475,746 A | * | 12/1995 | Miller et al. ........... 379/201.03 |
| 5,499,371 A | | 3/1996 | Henninger et al. |
| 5,694,549 A | * | 12/1997 | Carlin et al. ................ 709/250 |
| 5,694,593 A | | 12/1997 | Baclawski |
| 5,794,050 A | * | 8/1998 | Dahlgren et al. ........... 717/144 |
| 5,870,739 A | | 2/1999 | Davis, III et al. |
| 5,873,079 A | | 2/1999 | Davis, III et al. |
| 5,875,333 A | | 2/1999 | Fish et al. |
| 5,884,304 A | | 3/1999 | Davis, III et al. |
| 5,890,158 A | | 3/1999 | House et al. |
| 6,029,165 A | | 2/2000 | Gable |
| 6,038,668 A | | 3/2000 | Chipman et al. |
| 6,115,712 A | * | 9/2000 | Islam et al. ................... 707/10 |

(List continued on next page.)

FOREIGN PATENT DOCUMENTS

WO        WO 99/57656        11/1999

OTHER PUBLICATIONS

Mena et al., "OBSERVER: An Approach for Query Processing in Global Information Systems Based on Interoperation Across Pre–Existing Ontologies", *Proceedings of the 1st IFCIS International Conference on Cooperative Information Systems*, Jun. 1997, pp. 14–25.

Huhns et al., "Ontologies for Agents", *IEEE Internet Computing*, vol. 1, No. 6, Nov./Dec. 1997, pp. 81–83.

Bayardo et al., "InfoSleuth: Agent–Based Semantic Integration of Information in Open and Dynamic Environments", *Proceedings of the 1997 ACM SIGMOD International Conference of Management Data*, May 13–15, 1997, pp. 195–206.

International Search Report, for International Application No. PCT/US02/09528, Filed Mar. 26, 2002, Jun. 26, 2002, 2 pages.

*Primary Examiner*—Jean M. Corrielus
(74) *Attorney, Agent, or Firm*—Christie, Parker & Hale, LLP

(57) ABSTRACT

An intelligent data assimilation system including an ontology description, workflows, and logical search objects. The logical search objects operably connect to external and internal data providers and return search results using an ontology describing atomic data objects and semantic objects. The semantic objects are grouped into larger semantic structures by workflows to create customized services that return search results termed data products. Services are accessed through an application server capable of responding to service requests from different types of data clients. Graphical user interfaces provide facilities for creating logical search objects and aggregating logical search objects into workflows and services.

87 Claims, 18 Drawing Sheets

U.S. PATENT DOCUMENTS

| | | |
|---|---|---|
| 6,192,364 B1 | 2/2001 | Baclawski |
| 6,199,195 B1 | 3/2001 | Goodwin et al. |
| 6,466,933 B1 * | 10/2002 | Huang et al. .................. 707/3 |
| 6,513,059 B1 * | 1/2003 | Gupta et al. ................ 709/202 |
| 6,564,263 B1 * | 5/2003 | Bergman et al. ............ 709/231 |
| 6,581,059 B1 * | 6/2003 | Barrett et al. .................. 707/9 |
| 6,772,180 B1 * | 8/2004 | Li et al. ..................... 715/513 |
| 2002/0032677 A1 * | 3/2002 | Morgenthaler et al. ........ 707/3 |
| 2002/0133504 A1 * | 9/2002 | Vlahos et al. ........... 707/104.1 |

* cited by examiner

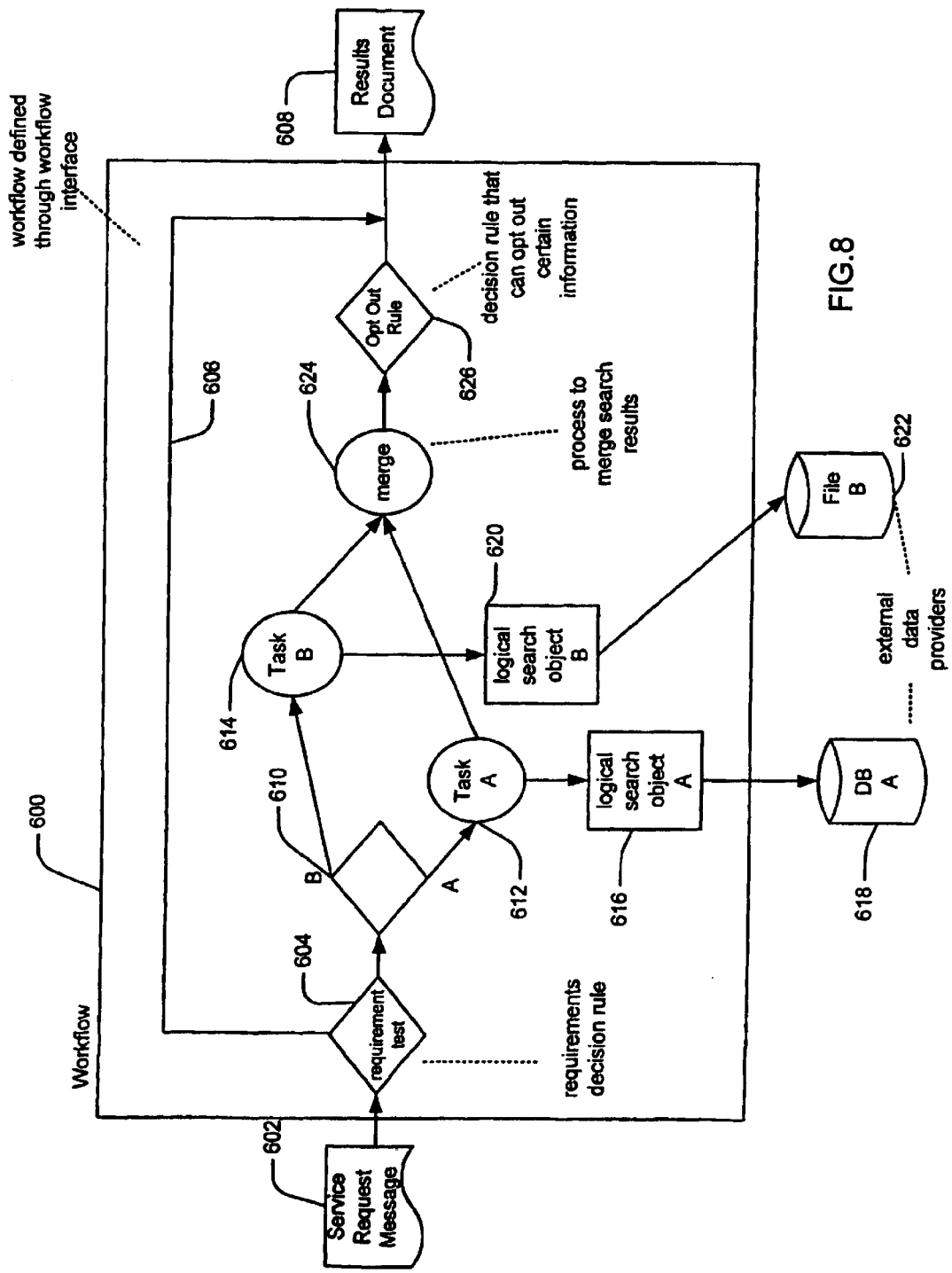

Sample Service Request Message
```
<?xml version="1.0" encoding="UTF-8"?>
<message type="ServiceRequest" source-id="com.searchco">
    <data>
        <service-request message-id="11001100">
            <service-item sku="CSRASearch" item="1">
                <parameter name=1"firstname1" value="John"    />
                <parameter name=1"lastname1" value="Smith"    />
                <notification type="email">
                    <parameter name="address"
                    value="John.Smith@company.com"  />
                    <format style="email"  />
                </notification>
                <result-format>
                    <format style="csra-results"  />
                </ result-format>

</ results>
            </ service-item>
        </ service-request>
    </ data>
</ message>
```

FIG. 14

Sample Status Messages
```
<?xml version="1.0" encoding="UTF-8"?>                              1118
<message type="Status" source-id="com.searchco" >
    <data>     1100     1119                      1122
        <status message-id="1010010101">
            <status-request item "1" IDAS-id="394" />  ⎫  1124
            <status-request item "2" IDAS-id="488" />  ⎬
            <status-request item "3" IDAS-id="506" />  ⎭
            <status-request item "4" IDAS-id="13892192312" />
        </status>
    </data>
</message>
```

FIG. 15

Sample Cancel Messages
```
<?xml version="1.0"?>           1127              1126
<message type="Cancel" source-id="com.searchco">
    <data>    1128                      1130
        <cancel message-id="1234567890">
            <cancel-request item "1" IDAS-id="1234567890" />     1132
            <cancel-request item "2" IDAS-id="2345678901" />
        </cancel>
    </data>
</message>
```

FIG. 16

Sample Output Request Messages
```
<?xml version="1.0"?>
<message type="OutputRequest" source-id="com.searchco" >
    <data>                 1136
        <output message-id="1234567890" >        1138        1140
            <output-request item= "1" IDAS-id="1234567890" />
                <format style="pdf" />         1142        1141
            </ output-request>        1144
            <output-request item "2" IDAS-id=" 2345678901". />
                <format style=" html" />
            </ output-request>
        </output>
    </data>
</message>
```

FIG. 17

Sample Response Messages
Sample of a message return when a service request has been accepted.
```
<?xml version="1.0"?>
<message type="Response" source-id="IDAS">
    <data>
        <service-response message-id="1010010101">
            <response item= "1" result=" Success"
            request="Order" IDAS-id="345234234">
                <response-value>Workflow started at 01:23pm
                September 4th </ response-value>
            </ response>
                <response item "2" result=" Success"
                request=" Order" IDAS-id="345234234">
                September 4th, 2001 </ response-value>
            </ response>
        </service-response>
    </data>
</ IDAS-message>
```

FIG. 18

METHOD AND APPARATUS FOR INTELLIGENT DATA ASSIMILATION

CROSS-REFERENCE TO RELATED APPLICATIONS

This application claims the benefit of U.S. Provisional Patent Application No. 60/278,930 filed on Mar. 26th, 2001 which is hereby incorporated by reference as if set forth in full herein.

BACKGROUND OF THE INVENTION

This invention relates generally to the field of servers coupled to computer networks and more specifically to servers used as search engines.

Web servers are software applications hosted by computer systems operably connected to the Internet. Web servers receive requests from Web clients and provide responses in the form of documents written in a document markup language such as Hyper Text Markup Language (HTML). The first Web servers operated as connections to file systems and served static HTML documents stored as files within a computer system.

The static HTML documents were quickly replaced by programs that accept as input parameters a client request and generate as output a document. These programs are typically written in a variety of interpreted procedural languages such as Perl and acquired procedural languages such as C.

The use of document generating programs also introduced new capabilities. Data could be drawn from any source and used to create a document. For example, databases could be queried and the results used within a document. Furthermore, the document generating programs could create side effects during the execution of a document generating program. For example, a typical side effect may include creation and storage of tracking statistics for later use and analysis by a Web site's host.

The use of document generating programs created a bottleneck within a computer system hosting a Web server. Each document generating program ran in its own process and the constant creation and destruction of the required processes created unacceptable overhead requirements. These overhead requirements resulted in the creation of application servers capable of invoking document generation programs without creating new processes.

In one type of such an application server, the application server comprises an interpreter and the document generating programs are written in a proprietary programming language. In the case where the proprietary programming language is a procedural language, the application server reads and runs the document generating programs without invoking a new process. In the case where the proprietary programming language is an object oriented language such as Java, each document generating program is a software object known as a servlet. In this case, the Web server invokes the servlets as needed and the servlets handle the remaining document generation functions.

Previous development of Web servers focused on producing the most efficient use of computing resources to produce finer and finer vertical slices through a Web site. For example, a servlet once invoked includes all of the necessary logic necessary to acquire data according to a client request, format the acquired data into a document, and report back to the hosting system any statistics about the client/servlet interaction. Finer and finer vertical slices through a Web site leads to an unscalable Web server architecture because all the logic for acquiring data, generating a document, and producing side effects is included within a monolithic software object thus defeating the ability to reuse or integrate a particular software object in another system or software object.

Therefore, a need exists for a scalable Web server architecture that features a high degree of reusability of a Web server's components. The present invention meets such a need.

SUMMARY OF THE INVENTION

In one aspect of the invention, a method is provided for fulfilling a data service request. The method includes providing an ontology description of a data service a first logical search object operably coupled via a first communications link to a data provider. The first logical search object transmits to the data provider via the communications link a search request generated by the first logical search object from the data service request. The first logical search object receives from the data provider via the communications link a data set in response to the search request. The first logical search object generates a knowledge instance from the data set using the ontology description.

In other aspects of the invention, the method for fulfilling a data service request is adapted for a plurality of data providers including a database server, a FTP server, a Web server, a file system, and a human data provider. Additionally, the method is adapted for a communications protocol proprietary to a data provider.

In another aspect of the invention, the data service request is included in a XML document.

In another aspect of the invention, the method for fulfilling a data service request further includes providing a first workflow operably coupled to the logical search object and transmitting by the first logical search object to the first workflow the knowledge instance.

In another aspect of the invention, the method for fulfilling a data service request further includes providing a second logical search object operably coupled to the first workflow, with the first workflow encapsulating the ontological relationship between the first and second logical search objects.

In another aspect of the invention, the method for fulfilling a data service request further includes providing an application server operably coupling a data client to the first workflow via a second communications link. The application server receives from the data client via the second communications link a data service request message with the data service request included in the data service request message. The application server transmits to the first workflow the data service request message and the first workflow transmits to the logical search object the data service request message.

In other aspects of the invention, the second communications link is adapted for communications using SMTP, JMS, HTTP, or RMI.

In another aspect of the invention, the method for fulfilling a data service request further includes providing a formatter and formatting by the formatter the data set encapsulated in the knowledge instance into a format requested by the data client.

In another aspect of the invention, the method for fulfilling a data service request further includes providing a second workflow operably coupled to the first workflow.

In another aspect of the invention, a data processing system is adapted to access a data provider via a communications link. The data processing system includes a processor and a memory operably coupled to the processor and having program instructions stored therein, the processor being operable to execute the program instructions. The program instructions include receiving by a software object a search request message document and generating by the software object a data request for the data provider from the search request message document. The software object transmits to the data provider the data request via the communications link. The software object receives from the data provider a data set via the communications link and generates a semantic object from the data set.

In another aspect of the invention, s data processing system adapted to access a data provider via a communications link includes a parser adaptor operably coupled to a software object. A parser semantic description of the data set and a semantic object semantic description is provided for use by the parser adaptor. The parser adaptor generates extracted data from the data set using the parser semantic description. The parser adaptor then generates a semantic object using the extracted data according to the semantic object semantic description.

In another aspect of the invention, a data processing system adapted to access a data provider via a communications link includes a request builder operably coupled to a software object. A native object is operably coupled to the request builder with the native object encapsulating implementation details of a data request for the data provider. A native semantic description is provided including ontology information describing a data structure used by the request builder to build a data request for the data provider. The request builder transmits to the native object a search request and the native object generates a data request from the search request using the native semantic description.

BRIEF DESCRIPTION OF THE DRAWINGS

These and other features, aspects, and advantages of the present invention will become better understood with regard to the following description and accompanying drawings where:

FIG. 8 is a diagram depicting the operations of an embodiment of an exemplary workflow according to the present invention;

FIG. 14 is an XML document embodiment of an exemplary service request message according to the present invention;

FIG. 15 is an XML document embodiment of an exemplary status message according to the present invention;

FIG. 16 is an, XML document embodiment of an exemplary cancel message according to the present invention;

FIG. 17 is an XML document embodiment of an exemplary output message according to the present invention; and FIG. 18 is an XML document embodiment of an exemplary response message according to the present invention.

DETAILED DESCRIPTION OF THE INVENTION

Figure 1:
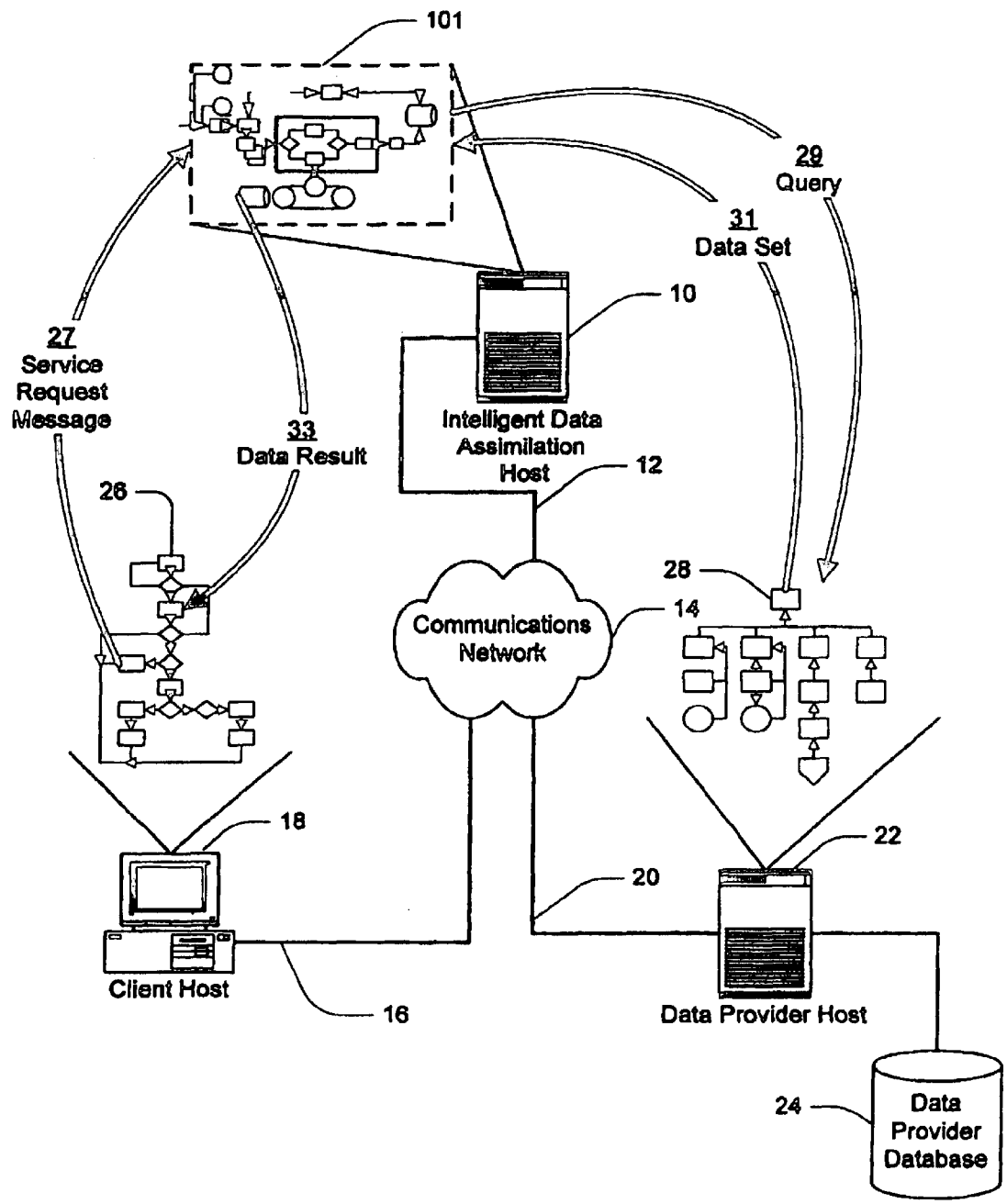
FIG. 1 is a deployment diagram of an intelligent data assimilation system according to the present invention.

FIG. 1 is a deployment diagram of an intelligent data assimilation system according to the present invention. An intelligent data assimilation system host 10 is operably coupled to a communications network 14, such as the Internet, via a communications link 12 adapted for communications using a variety of transport protocols such as Transmission Control Protocol/Internet Protocol (TCP/IP). The logical search object host communicates with a data provider host 22 operably coupled to the communications network by a communications link 20 adapted for communications using TCP/IP. The data provider host is operably coupled to a data store such as, but not limited to, a data provider database 24. A data client host 18 is operably coupled to the intelligent data assimilation system host via a communications link 16 adapted for communications using TCP/IP.

In operation, a data client 26 hosted by the data client host transmits a service request message 27 to an intelligent data assimilation system 101 hosted by the intelligent data assimilation system host. The service request message includes' search parameters that the intelligent data assimilation system uses to generate and transmit a query 29 to a data provider server 28 hosted by the data provider host. The data provider server responds to the query by generating and transmitting a data set 31 back to the intelligent data assimilation system. The intelligent data assimilation system populates the ontological instance of the returned data and formats the data set into a formatted data result 33 transmitted to the data client as a response to the service request message.

Figure 2:
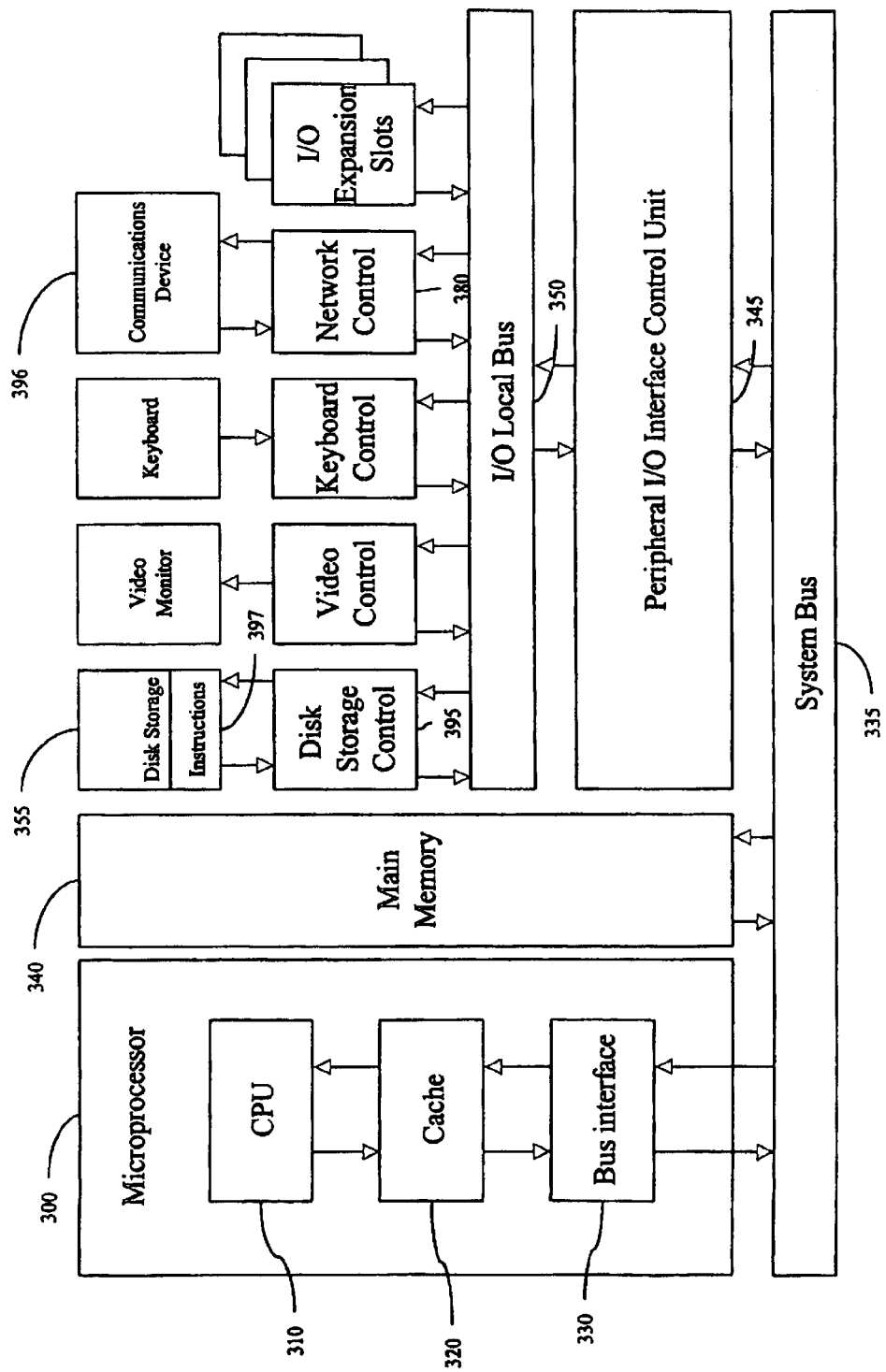
FIG. 2 is a hardware architecture diagram of a general purpose computer suitable for use as an intelligent data assimilation system host.

FIG. 2 is a hardware architecture diagram of a general purpose computer suitable for use as an intelligent data assimilation system host. A processor 300, comprising a Central Processing Unit (CPU) 310, a memory cache 320, and a bus interface 330, is operatively coupled via a system bus 335 to a main memory 340 and a I/O control unit 345.

The I/O control unit is operatively coupled via a I/O local bus 350 to a disk storage controller 395, and a network controller 380.

The disk storage controller is operatively coupled to a disk storage device 325. Computer program instructions 397 for implementing an intelligent data assimilation system are stored on the disk storage device until the microprocessor retrieves the computer program instructions and stores them in the main memory. The microprocessor then executes the computer program instructions stored in the main memory to implement the features of an intelligent data assimilation system.

The network controller is operatively coupled to a communications device 396. The communications device is adapted to allow an intelligent data assimilation system hosted by the general purpose computer to communicate via a computer network such as the Internet with other software objects on the computer network.

Figure 3:
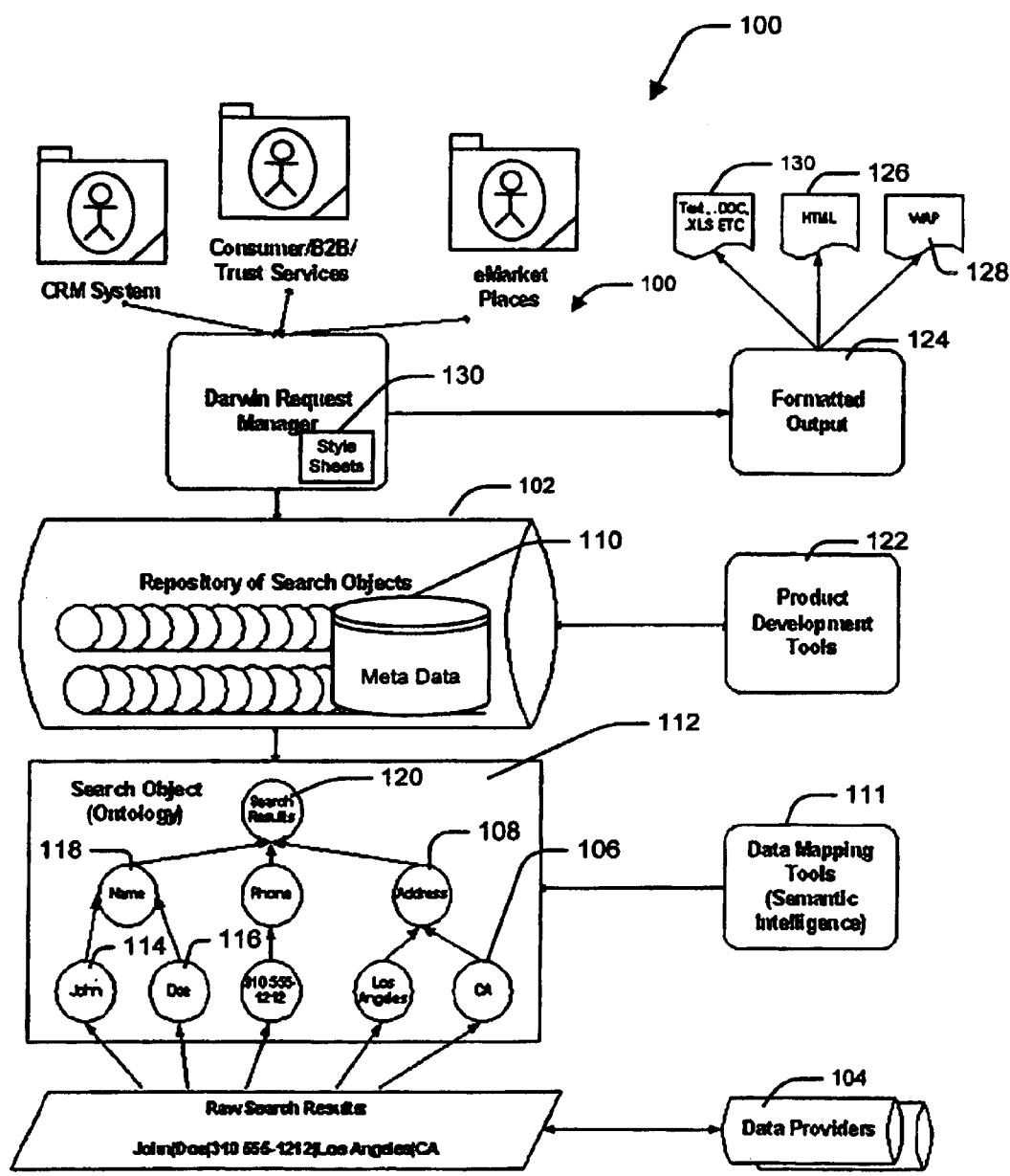
FIG. 3 is an architecture diagram illustrating an embodiment of an intelligent data assimilation system according to the present invention.

FIG. 3 is an architecture diagram illustrating an embodiment of a an intelligent data assimilation system according to the present invention. An intelligent data assimilation system is coupled to a computer network through the services of an application server (not shown). The intelligent data assimilation system is an object-oriented component-based server platform providing mechanisms and subsystems to create and manipulate a repository 102 of Logical Search Objects (LSOs) that encapsulate knowledge and capabilities used to execute a search for data from a plurality of data providers 104. The intelligent data assimilation system is accessed by a data client via the communications network through the application server.

The data providers are logically coupled to the intelligent data assimilation system using a variety of methods. The data providers provide data sets including various data products from data providers such as data aggregators, search robots or agents, HTML-based search engines, in-house databases, or any other mechanism capable of providing a mechanism to extract electronic information. Additionally, a data provider can be a human actor receiving a request from the intelligent data assimilation system to find and return a data set that is not electronically accessible. For example, a private investigator may be used to collect data for a data set such as confirming the physical location of a person.

A LSO 106 is a reusable, configurable and self-contained software component capable of establishing connectivity to a particular data set provided by a data provider. Furthermore, a LSO includes logic for qualifying or filtering a data set and delivering the resulting information as a document written in extensible Markup Language (XML) or as an intelligent data object herein termed a semantic object 108. Additionally, a LSO reveals its capabilities and information to other software components for use by those software components.

The complete definition of a LSO is stored in a database 110 as a metadata description. At runtime, when a specific instance of a particular LSO is called for, an LSO instance is created from the LSO's metadata definition. However, the intelligent data assimilation system has the ability to pre-instantiate LSOs if needed.

The intelligent data assimilation system provides data mapping tools to add semantic intelligence to atomic data with the purpose of providing users the ability to manipulate LSO results. By abstracting (grouping) various fields together into a well-defined ontology 112, an intelligent data assimilation system provides abstracted views of data allowing users to manipulate encapsulated data. For example, an intelligent data assimilation system can group a LSO called "First Name" 114 and a LSO called "Last Name" 116 into a semantic object 118 called "Name", and then group "Name" with another semantic object called "Address" 108 into a semantic object called "Person" 120. This semantic structure allows intelligent traversal and identification of any available information.

By revealing all their intelligence on connectivity, such as ontological data and cost, the LSOs provide a mechanism for the logical search object subsystems to provide tools 122 for the definition of services that may be requested from the intelligent data assimilation system by a data client. The services generate results in the form of data products including data requested by the data client. Through the use of a graphical user interface, designers view all the available LSOs and semantic objects in a repository and manipulate LSOs and select desired LSOs or semantic objects and place LSOs and semantic objects into workflows.

Each workflow typically represents a single service offering. By placing one or many LSOs into a workflow, a designer creates workflows resulting in a service. Some of the features of these workflows include the ability to run multiple LSOs in parallel, define failover LSOs, and define contingencies where the output of one LSO can be the input of another object.

An ontology designer 122, is used to create the data mapping of data from a data provider into an intelligent data assimilation system ontology. It is through this process that the intelligent abstractions of data are performed to create semantic objects used by the LSOs maintained in the intelligent data assimilation system repository.

A product configurator 122 is used to browse and select semantic objects and apply workflow definitions with the purpose of creating intelligent data assimilation system services. The product configurator provides robust productivity features such as drag and drop functionality and wizard style forms.

The product configurator surfaces the information encapsulated in semantic objects. This allows the designer to manipulate data as simple atomic data or highly abstracted complex data. Data encapsulated in a LSO is mapped as a single semantic object, thus the designer is able to place that semantic object representing a particular LSO into a workflow. However, semantic objects are not constrained by LSOs, the product configurator allows the designer to manipulate even higher abstracted semantic objects that straddle multiple LSOs and thus the product configurator derives which LSOs are to be inserted into a workflow for a given service and what constraints, if any, exist between the LSOs encapsulated in a semantic object.

With LSOs encapsulating information about connectivity, cost, query mechanism, and ontology, the product configurator is able to manipulate abstractions of data and place those items into a workflow.

In addition to the ability to choose and place semantic objects into a workflow the product configurator also provides the designer the ability to configure other attributes about a data product generated by the service including input display attributes, input rules, result eXtensible Style Language (XSL) stylesheets, and other attributes that define the data product.

When the service definition is complete, the designer has the capability to iteratively test and enhance the service in real-time, using either live or simulated data, and see the results in real-time and when satisfied that the service is complete, save the service to the intelligent data assimilation system metadata store and thus have a real time deployment of the service.

The intelligent data assimilation system consolidates the results of all LSOs executed in a workflow and represents the resulting data as XML documents that can be delivered to a data client in that form. In one embodiment, the intelligent data assimilation system reformats the XML documents to create formatted outputs 124 using XSL stylesheets 125. These XSL stylesheets provide for the rendering of formatted data, including the simultaneous delivery of results in HTML 126, XML, Wireless Application Protocol (WAP) 128, Rich Text Format (RTF), Word (DOC), WordPerfect (WPS), or other formats 130.

An intelligent data assimilation system ontology facilitates the exchange of data between multiple computer systems independently of the individual system technologies, information architectures and application domain, and allows the creation of groupings of atomic data fields into intelligent building blocks termed semantic objects allowing the construction of services provided by the intelligent data assimilation system.

An ontology includes a vocabulary of terms and a specification of what those terms mean. The intelligent data assimilation system ontology provides a set of well-founded constructs that are used to build meaningful higher-level knowledge. Basic terms in the intelligent data assimilation system ontology are selected such that basic foundational concepts and distinctions are defined and specified. The basic terms chosen form a complete set, whose relationship to one another is defined using formal techniques. These formally defined relationships provide the semantic basis for the terminology chosen. It is these relationships included in the intelligent data assimilation system ontology that enables the expression of domain-specific knowledge without including domain-specific terms.

An intelligent data assimilation system ontology includes definitions of abstractions. For example, a person semantic is constructed by the underlying atomic or semantic items, first name, middle name, and last name. The definition is used to create a knowledge instance of the ontology, for example when at runtime the ontology is populated with specific semantic and atomic instances returned by the LSOs.

The life span of a definition and a knowledge instance vary. Definitions included in an intelligent data assimilation system ontology are persistent, reused extensively, and have global scope within an intelligent data assimilation system. A knowledge instance created at run time is either transient or persistent. Within the context of the intelligent data assimilation system, requests are typically transient because knowledge is persisted into the ontology only for the duration of a particular request instance and then discarded. For example, data is retrieved from a data provider, a portion of the ontology corresponding to LSOs in a workflow is populated using a run-time knowledge instance, and only the knowledge instance created within a particular request instance is processed and once processed the knowledge instance is discarded from the ontology. In one embodiment of an intelligent data assimilation system according to the present invention, knowledge instances are persistent such that the knowledge instances can be later queried from the intelligent data assimilation system and assimilated into another service request. A persistent knowledge instance thus has global scope as described above.

Commerce agents using the intelligent data assimilation system are adaptable and able to communicate domain-specific knowledge. Commerce agents do this by using the basic terms and relationships defined in the intelligent data assimilation system ontology and through these definitions of the basic terms the intelligent data assimilation system allows the basic terms to, be grouped (abstracted) to form higher-level intelligent constructs.

In one embodiment of an intelligent data assimilation system according to the present invention, an intelligent data assimilation system ontology is stored in a metastore as an XML definition and is represented at many different levels using its XML definition.

An intelligent data assimilation system enforces security for all data clients. The fundamental mechanism for performing security is name and password authentication against the Java Naming and Directory Interface (JNDI) tree in the intelligent data assimilation system. Messages sent to intelligent data assimilation system across a protocol method, such as Java Messaging Service (JMS), Remote Method Invocation (RMI), or Hyper Text Transfer Protocol (HTTP), have name and password authentication level security applied. The intelligent data assimilation system also supports the use of digital signatures. Data sent to the server may include a digital signature that can be verified against a checksum generated from the request and a stored public key. The intelligent data assimilation system also supports data encryption.

Once the intelligent data assimilation system has accepted a service request message at a processing tier, the intelligent data assimilation system secures the service request against available services for that customer. Clients do not have access to services not available to them.

An intelligent data assimilation system also enforces the return of results to the originating data client. This type of security restricts access to search results and allows access to data by those data clients that submitted a corresponding service request.

The intelligent data assimilation system supports a notification mechanism that allows for multiple notifications for any given request. This feature allows the intelligent data assimilation system to respond to a service request by sending results to one or all of a user's email, cell phone, web page etc.

The intelligent data assimilation system enforces business rules that relate to particular business processes. These business rules are abstracted into a generalized mechanism through which an intelligent data assimilation system conditionally evaluates and determines an appropriate action. The intelligent data assimilation system supports the ability to perform rules validation at various levels of the intelligent data assimilation system.

The intelligent data assimilation system rule architecture is open such that there are well defined exit points that are expected to return boolean values that indicate the success or failure of any rule. These rules are implemented by deployment of any business process, be it a manual intervention, a proprietary algorithm, or an off-the-shelf rules engine.

The intelligent data assimilation system architecture is designed to take advantage of current enterprise development standards. In one embodiment of an intelligent data assimilation system according to the present invention, components of an intelligent data assimilation system adhere to the Java 2 Enterprise Edition (J2EE) standard for developing multi-tiered enterprise applications. J2EE simplifies enterprise applications by basing them on standardized, modular components, by providing a complete set of services to those components, and by handling many details of application behavior automatically, without complex programming. This embodiment of an intelligent data assimilation system also takes advantage of many features of the J2EE standards such as software portability, the JDBC API for database access, and a security model that protects data even in Internet applications.

In one embodiment of an intelligent data assimilation system according to the present invention, the underlying platform for these components is a J2EE compatible application server. A suitable application server is BEA Weblogic Application Server. The capabilities of BEA's Weblogic Application Server include a distributed transaction manager, Java Messaging Services (JMS), support for extensible Markup Language (XML), and J2EE standards support.

In one embodiment of an intelligent data assimilation system according to the present invention, an intelligent data assimilation system uses a BEA Weblogic Process Integrator (WLPI) to implement workflow tasks. WLPI provides the intelligent data assimilation system the ability to design and automate business processes that integrate data provider applications, search services, and human intervention.

In an embodiment of an intelligent data assimilation system according to the present invention, an Oracle DataBase Management System (DBMS) provides the intelligent data assimilation system with persistence capabilities.

Figure 4:
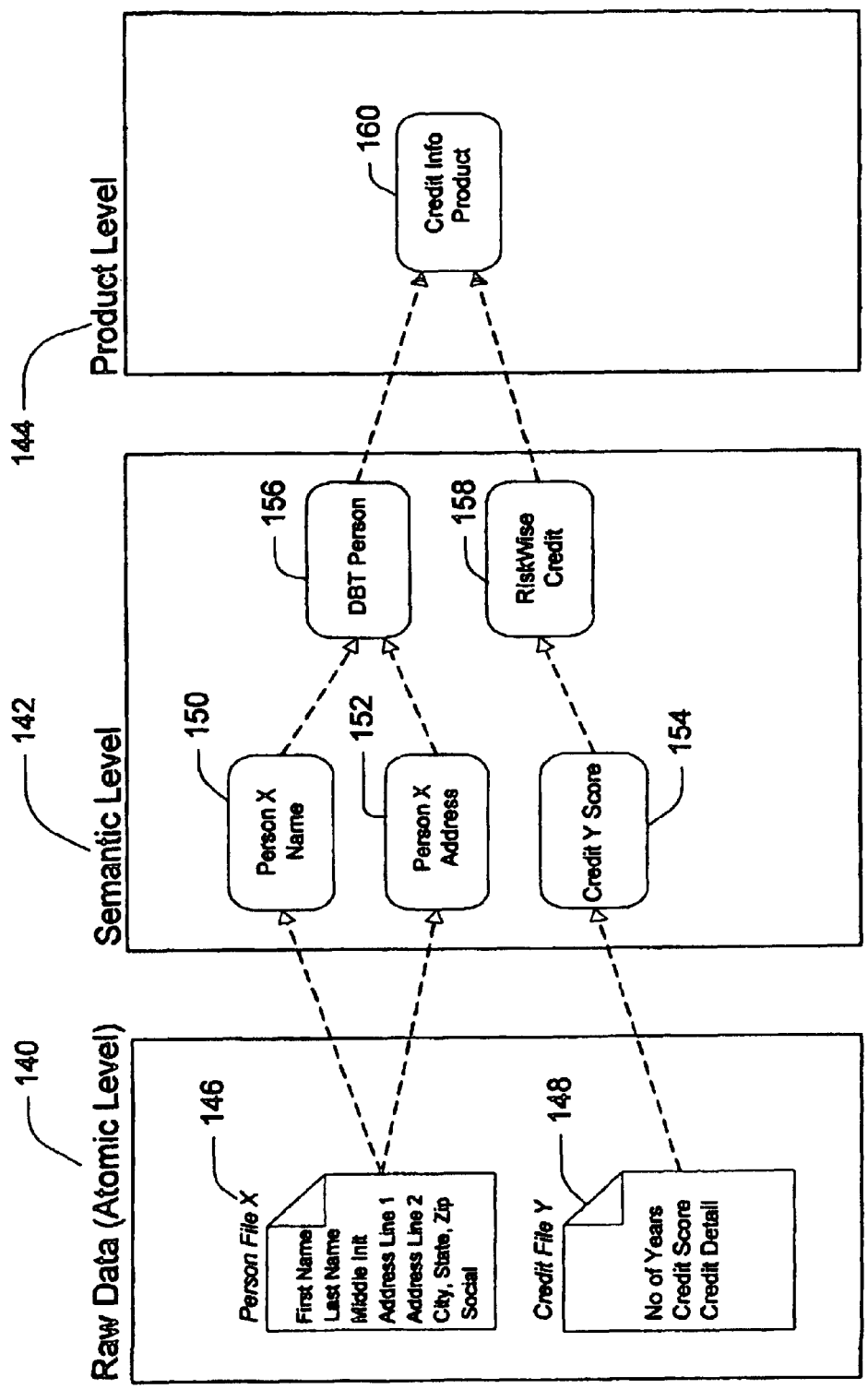
FIG. 4 is a diagram of the levels within one embodiment of an intelligent data assimilation system ontology according to the present invention.

FIG. 4 is a diagram of levels within an exemplary portion of one embodiment of an intelligent data assimilation system ontology according to the present invention. The intelligent data assimilation system ontology manages three levels of data abstraction. Initially, raw data fields 140 in a data set are positionally mapped from a data provider into atomic objects such as person atomic object 146 and credit atomic object 148. Atomic objects add type and basic naming information to the data fields. Intelligence about the meaning of the data fields included in the atomic objects is created through the semantic object abstractions in the semantic level 142.

The intelligent data assimilation system views data fields as the most basic elements of any data set retrievable by the intelligent data assimilation system. Prior to the ontological definition, these data fields generally include no semantic context or intelligence. Character or byte strings, numbers, decimals and dates can be identified; however, no meaningful definition is applied providing understanding of the data. For example, position 1 to 9 in a data field may include the value "561929975" but a typical data assimilation system does not understand whether this is a social security number, order number, or product number. Associating a semantic context to the data field by an intelligent data assimilation system results in an atomic object.

Atomic objects have a semantic context associated with a value of a particular type. Thus, data fields can be translated into an atomic object. For example, the value might be a string "John Oct. 9, 2000 21:23.234 8A56FB" and include semantic information in the format: First Name, Date, and Result of Query ID.

Semantic objects are groupings of atomic objects, defined in the intelligent data assimilation system ontology, which have a particular business meaning. Intelligence is created by these higher-level groupings. For example, the following atomic objects: first name 147, middle initial 151, and last name 149 can be grouped to provide a "person name" semantic object 150. Additionally, the following atomic objects: address1 153, city 155, state 157, and zip code 159 are grouped to create a "person address" semantic object 152. Subsequently, a higher-level semantic object can be created by combining a "person name" with a "person address" to build a "person" semantic object 156. In a similar fashion, a credit file atomic object 148 is used to create a credit score semantic object 154. The credit score semantic object is then used to create a higher-level credit risk semantic object 158. Semantic objects are grouped in a data service level 144 of the intelligent data assimilation system ontology to create high-level data abstractions used by other sub-systems within in the intelligent data assimilation system.

Figure 5:
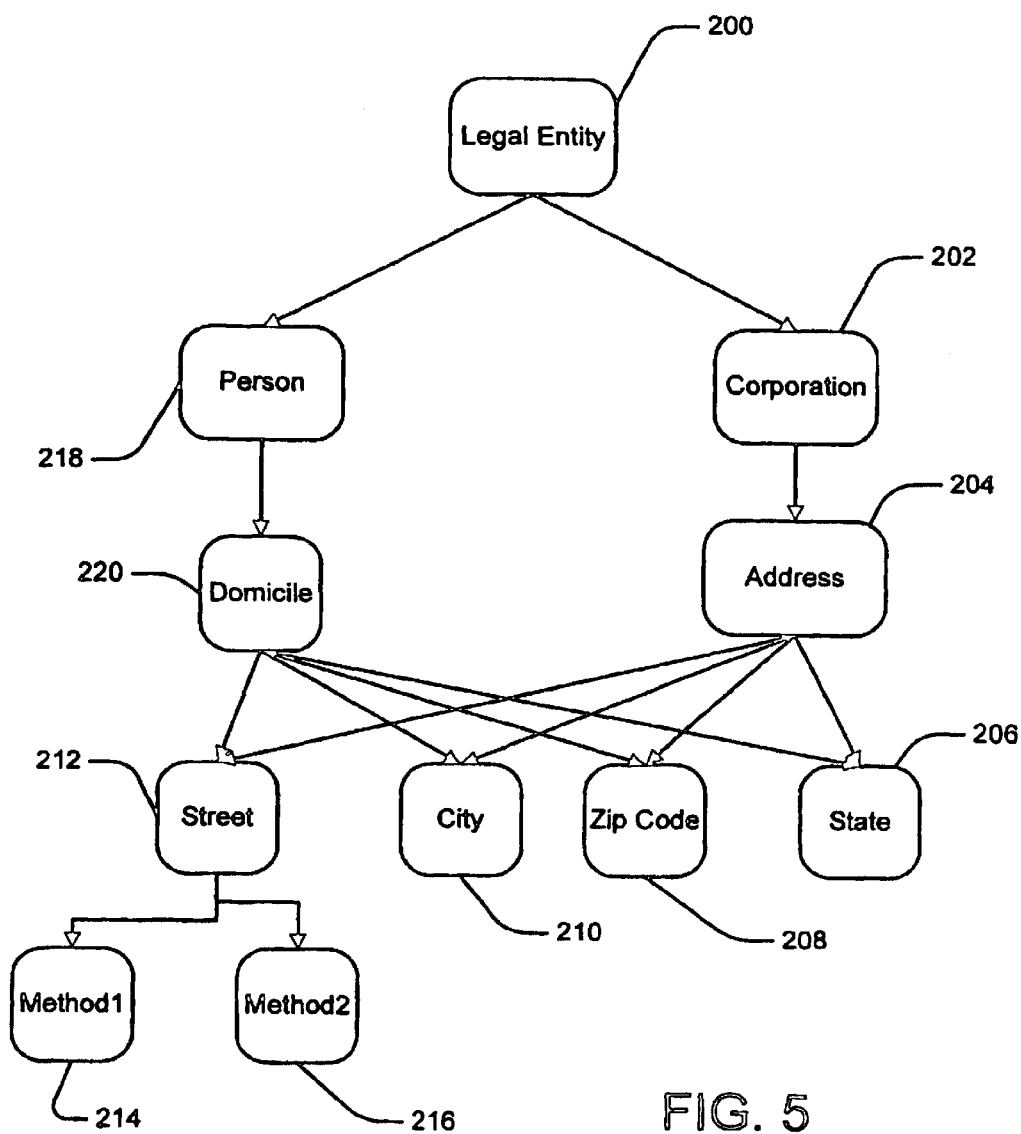
FIG. 5 is a diagram depicting an exemplary embodiment of an ontological relationship between semantic constructs and their associated logical search objects in an ontology according to the present invention.

FIG. 5 is a diagram depicting an exemplary embodiment of an ontological relationship between semantic constructs and their associated LSOs in an ontology according to the present invention. The exemplary embodiment depicts a legal entity class 200 with two children classes, person 218 and corporation 202. Each of these classes includes a child class encapsulating the concept of where an instantiation of the legal entity class may live as defined for legal purposes. In the case of the person class, the appropriate class is the domicile class 220 and for the corporation the appropriate class is the corporate address class 204. The classes street address 212, city 210, Zip Code 208, and state 206 have multiple parents through multiple inheritance, namely the domicile and corporate address class.

The street class further includes two methods, method 1 214 and method 2 216, for retrieving a street address. These methods can be addressed and used by an object sending a request to an instantiation of the domicile or corporate address class in order to customize the data provider for retrieving a street address. For example, a request for data about a person's domicile may include a request for a street address from tax records. Another request for data about the same person's domicile may include a request for a street address pulled from vehicle registration records. In each case, the data provider is different and a different method may be used to request and receive data from the different data providers.

In operation, instantiations of the domicile class or the corporation class answer requests for returning the legal address of a person or a corporation respectively. For example, if a request is made to find the legal address of a person when the system receives the appropriate request, it invokes a workflow that will instantiate the appropriate LSOs to fetch the requested data. Each of these objects contacts a data provider and requests and receives the appropriate data from the data provider. Associated with this workflow an instance of the ontology will be invoked and when the data has been retrieved, any node, (such as domicile in the example), in the instantiated ontology is able to represent the underlying aggregation of data for that particular node in the ontology. Thus, the domicile object with its ability to aggregate the received data, is capable of representing the person's address.

Figure 6:
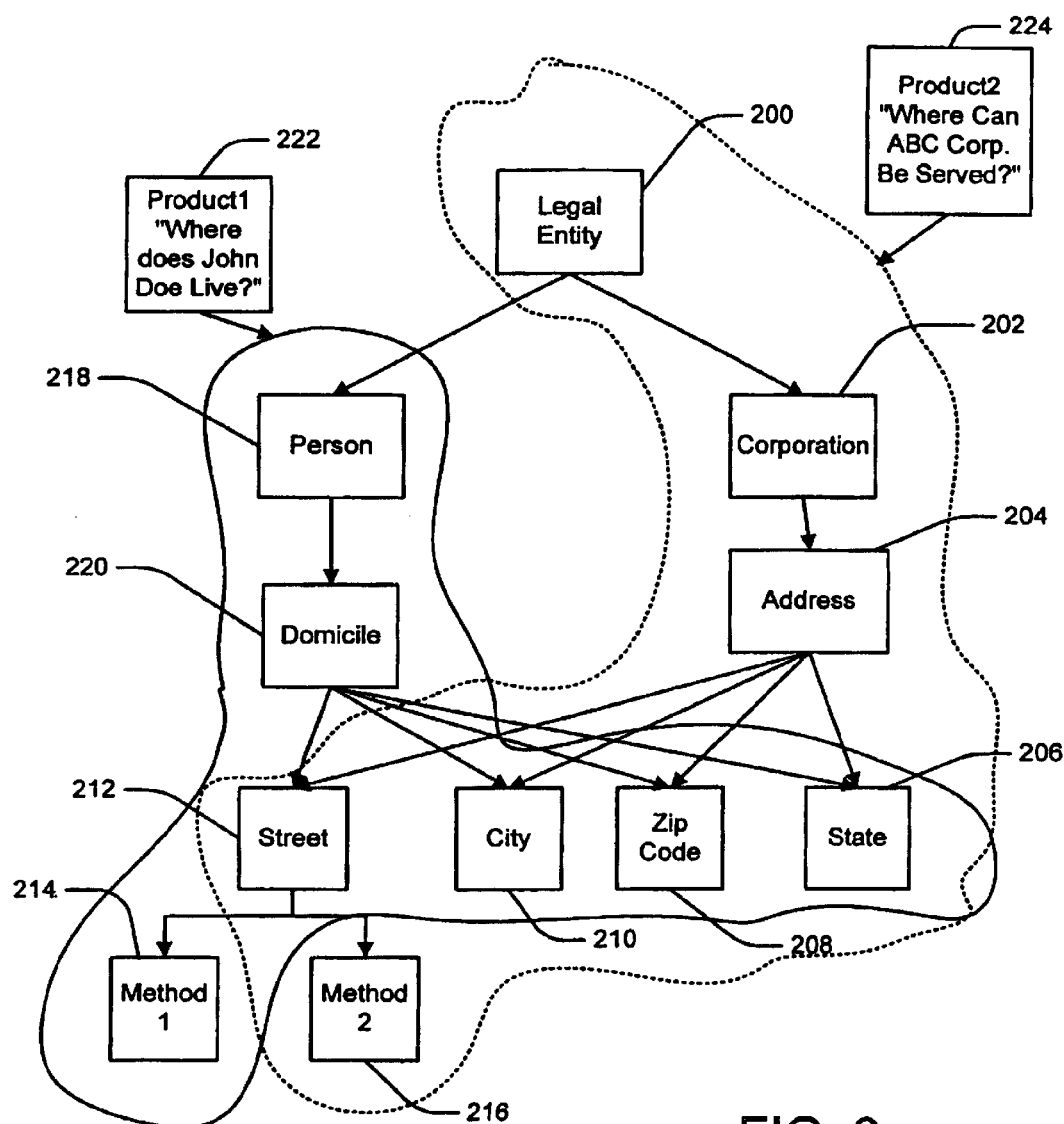
FIG. 6 is a diagram depicting an exemplary embodiment of how service classes are created using the ontological relationships of logical search objects according to the present invention.

FIG. 6 is a diagram depicting an exemplary embodiment of how service classes are created using the ontological relationships of LSOs according to the present invention. The ontological relationships between LSOs are selectively traversed using a data service class. Such a traversal through the ontology results in an answer to a query. For example, exemplary service class, Service 1 222, encapsulates a query "Where does John (a person) live?". An instantiation of the Service 1 class results in a traversal of the ontological relationships from person 218, to domicile 220, to street 212 using method 1 214, city 210, Zip Code, 208, and state 206. This traversal is shown as a solid line surrounding the appropriate objects.

In another example, exemplary service class, Service 2 224, encapsulates a query "Where can ABC corporation (a legal entity) be served?". An instantiation of the Service 2 class results in a traversal of the ontological relationships from legal entity 200, to corporation 202, to corporate address 220, to street 212 using method 2 216, to city 210, to Zip Code, 208, and to state 206. This traversal is shown as a broken line surrounding the appropriate objects.

The exemplary services exploit the ontological relationships between the LSOs by accessing the relationships in different ways. Service 1 encapsulates a query about a person's address and Service 2 encapsulates a query about a corporations place of service. In each case, the service must determine a street address and each service ultimately uses the same street, city, Zip Code, and state object classes. However, each service obtained access to these objects from a different parent class.

The semantic object construct is not limited to a particular LSO and thus a particular data set. The intelligent data assimilation system is capable of extrapolating LSOs and LSO's appropriate position in multiple workflows from the semantic object. Definitions of the intelligent data assimilation system ontology and the included semantic objects are held in a metadata store of the intelligent data assimilation system and are part of a global internal data dictionary.

A metadata store provides persistence for configuration data used by LSOs at execution time. A search configuration includes: an identification of the data provider, a mapping of the results data fields to the ontology of atomic objects known to the intelligent data assimilation system, and a mapping of the request data fields to the ontology of atomic objects known to the data provider. Finally, the search configuration includes reference to a LSO to use when performing a search at execution time.

Figure 7A:
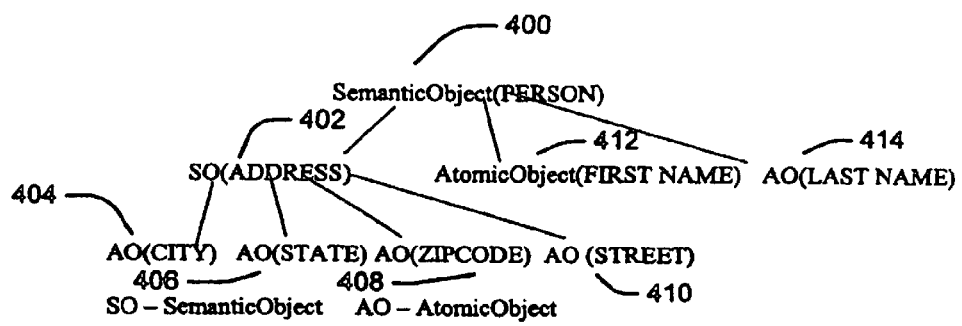
FIGS. 7a and 7b are diagrams depicting how semantic objects are described within the metadata store.
Figure 7B:
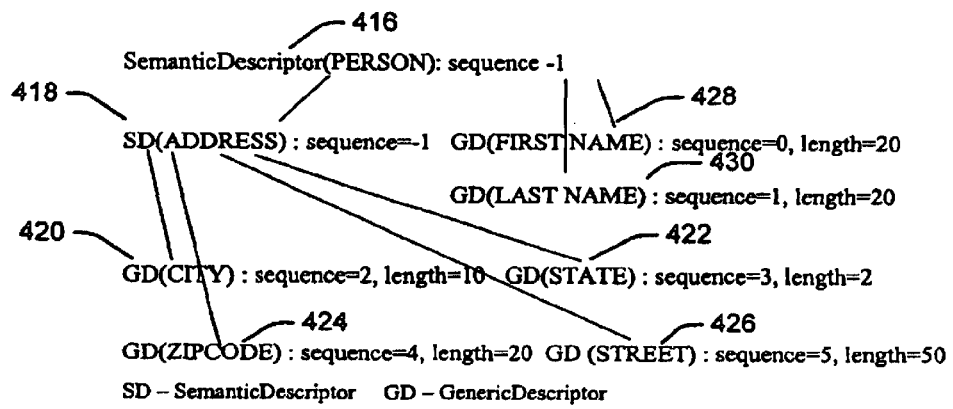

FIGS. 7a and 7b are diagrams depicting how semantic objects are described within the metadata store. A semantic object may include other semantic objects and ultimately atomic objects of varying types. For example, a semantic object person 400 includes another semantic object address 402, which includes state 404, city 406, Zip Code 408, and street number 410 atomic objects. The person semantic object also includes atomic objects first name 412 and last name 414.

FIG. 7b is a depiction of how the semantic object of FIG. 7a is constructed using a semantic descriptor stored in the metadata store within an embodiment of an intelligent data assimilation system according to the present invention. A generic descriptor, such as "city" data descriptor 420 is a concrete implementation of data descriptor including set methods. A data descriptor describes the name of the data, the type of the data and the data sequence. Since the data is just accessed, a data descriptor interface, only exposes get methods for accessing a data provider. A semantic descriptor, such as "person" semantic descriptor 416 exposes methods to retrieve child elements that the person semantic descriptor includes. These child elements could be other semantic descriptors, such as "address" semantic descriptor 418 or data descriptors such as "first name" data descriptor 428 and "last name" data descriptor 430. An interface defined in the intelligent data assimilation system has a concrete class that implements the functionality of the interface. For example, a data descriptor is implemented by a generic data descriptor. This class provides the set methods that are not exposed in the data descriptor interface. During initialization, components creating descriptors use a concrete class to create set values.

The following is a list of descriptors:
  DataDescriptor->exposes get methods for name, type, and sequence
  GenericDescriptor->concrete implementation of DataDescriptor that includes set methods
  PositionalDescriptor->exposes get methods for position, and length
  GenericPositionalDescriptor->concrete implementation of PositionalDescriptor that includes set methods
  SemanticDescriptor->exposes get methods elements, hasMoreElements, getNextElement
  GenericSemanticDescriptor->concrete implementation of SemanticDescriptor that includes set methods
  SemanticListDescriptor->exposes get methods getAtomicLength
  GenericSemanticListDescriptor->concrete implementation of SemanticListDescriptor that includes set methods The intelligent data assimilation system model abstracts how the data is represented and focuses more on how pieces of data relate to each other. An intelligent data assimilation system ontology is free to change without inhibiting another data provider's ontology. This provides extensibility because the intelligent data assimilation system and data provider are loosely coupled. An intelligent data assimilation system ontology constructs the semantic context where by search result definitions are defined.

An intelligent data assimilation system deploys a workflow engine that manages the execution of service requests that relate to services. The workflow engine is a state machine that manages tasks within a workflow with each workflow having a start node followed by zero or many task nodes followed by an end node.

In the process of defining a service the designer identifies all the LSOs that are included in a service. The LSOs are then associated with task nodes in the workflow and thus definition of a given service is achieved.

When the intelligent data assimilation system receives a request for the fulfillment of a particular service, the intelligent data assimilation system maps the service request to a specific workflow, instantiates the workflow, consolidates the resulting data sets returned by the workflow and invokes any analytical or business rule processing for the workflow. In one embodiment of an intelligent data assimilation system according to the present invention, the requestor is notified that the data set is available. In another embodiment, the data set is stored (herein termed persisted) for later retrieval by the requestor. In another embodiment, the resulting data set is delivered to the requester.

The intelligent data assimilation system workflow mechanism provides not only for the sequential execution of task nodes including LSOs but also provides for LSOs to be executed in parallel as well as the ability to create contingent relationships between the LSOs. For example the output of a particular LSO may be the input of another LSO. Additionally, the intelligent data assimilation system workflow mechanism allows for task nodes in the workflow to be associated with other workflows that could include services or other business processes, and thus create a mechanism whereby nesting workflows are used to generate different classes of services and workflows reused.

FIG. 8 is a diagram depicting the operations of an embodiment of an exemplary workflow according to the present invention. In one embodiment of an intelligent data assimilation system, the workflow processing environment used is a Weblogic Process Integrator (WLPI)supplied by BEA Systems, Inc. of San Jose Calif., USA. Workflows are specified using a Weblogic Process Integrator (WLPI) Studio software tool or by creating an XML representation of the workflow. The previously described metadata store includes the data used to construct a particular instance of a workflow used to fulfill a service request. Therefore, the metadata store manages the workflow definition and the LSO definitions that fulfill a service request.

A workflow 600 receives a service request from a service request handler 602 in the form of a XML document. The workflow validates the request at step 604. An exemplary validation includes determining if the request includes sufficient information to route and complete the request using internal decision rules. If the request is invalid, results are returned in a results document 608 without performing any search tasks. If the request is validated, then search tasks are initiated at node 610 to fulfill the request. A workflow can initiate multiple tasks at one time. In this exemplary workflow, task A 612 and task B 614 are initiated at one time. Task A uses LSO A 616 to connect to and retrieve data from an external data provider A 618. At the same time, task B uses LSO B 620 to connect to and retrieve data from an external data provider B 622. The results returned from the two LSOs are merged in a merge process 624. The merging of the results occurs according to an intelligent data assimilation system ontology as previously described.

The intelligent data assimilation system allows for additional filtering of a data set once the data has been assimilated. For example, optional "opt-out" rules may be applied to the merged results allowing individuals or entities to exclude personal information from the data set that the individuals or entities do not wish disseminated. An opt-out rule is an internal rule that stops certain information from being released to a service object in response to a data request. In one embodiment of a workflow according to the present invention, the results are returned to the service request handler 608 at the end of the workflow process in the case of an instant search. In an instant search, the data client transmits a search request with the expectation of receiving a search response within a short period of time during which the data client remains coupled to the intelligent data assimilation system. In another embodiment of a search request according to the present invention, the data client transmits a search request with the expectation of returning to the intelligent data assimilation system to retrieve the search results at a latter time.

Figure 9:
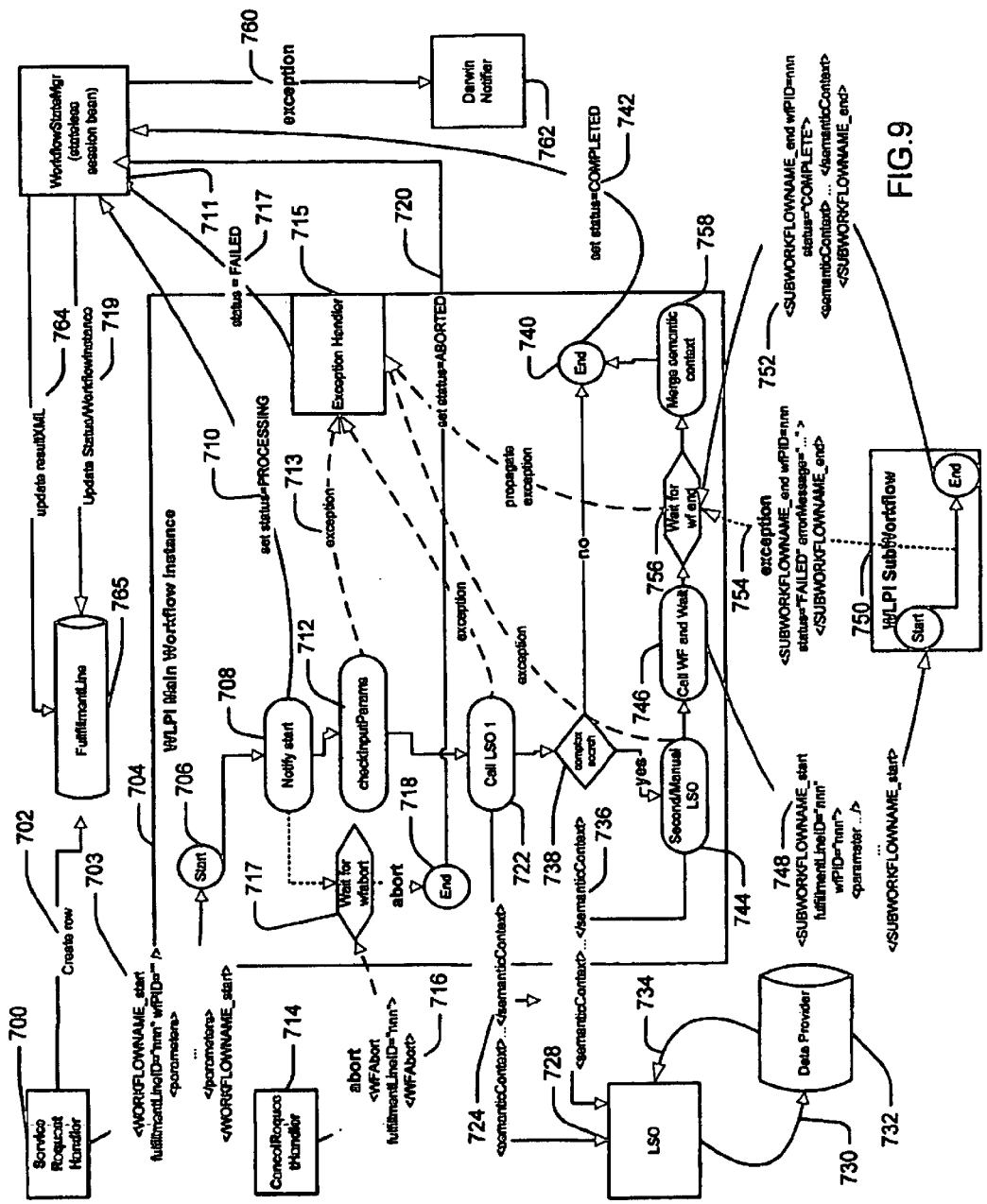
FIG. 9 is a collaboration diagram depicting the interactions within an embodiment of a workflow process according to the present invention.

FIG. 9 is a collaboration diagram depicting the interactions within an embodiment of a workflow according to the present invention. The depicted embodiment of a workflow includes several optional processes that may be used alone or collectively within a workflow.

An intelligent data assimilation system supports the ability to group together the fulfillment of numerous services in a single request. This provides a mechanism whereby an entire order with associated line items can be sent to the intelligent data assimilation system as a single request. When the intelligent data assimilation system receives a search service request message, a service request handler component creates one fulfillment request.

For each request item present in the message, a service request handler 700 creates a fulfillment line row 702 in a fulfillment line table 765 and invokes a workflow instance 704 passing the fulfillment line Id as a parameter.

The state of a running workflow is stored in the fulfillment line. When the workflow instance completes, the results of the search are stored in the fulfillment line. For non real-time requests intelligent data assimilation system sends a message to the workflow engine to asynchronously generate a workflow instance. All state information is maintained with the fulfillment line so that any following status requests messages can be answered. It is through the fulfillment line that an intelligent data assimilation system recognizes if a workflow instance is still processing, has failed, or is waiting for user input or the results of a manual search.

The invocation of the workflow instance includes a message 703 including the fulfillment line ID and the request parameters in the form of an XML document. The workflow instance receives the message and starts 706 a data collection process.

The workflow instance sends a notification 710 to a workflow state manager 711 during a start notification node 708. The workflow status manager transmits a status update message 719 to the fulfillment line so that a query of the fulfillment line will indicate that the workflow instance is working on the data request.

The workflow instance includes an abort node 712 within the workflow instance that waits for an external abort message 716 to be sent to the workflow instance from an external cancel request handler 714. If an abort message is received, the abort node ends 718 the data collection processes of the workflow instance and an abort message 720 is transmitted to the workflow state manager. In response, the workflow status manager updates the fulfillment line to indicate that the workflow instance has aborted.

The workflow instance checks the input parameters at node 712 to determine if the parameter values are properly formed for making a request of a data provider. If the input parameter values are not properly formed, an exception is thrown 713 to an exception handler. To maintain the appropriate error state in case of failure (runtime exceptions) each workflow instance has an exception handler 715. If anything goes wrong, such as the execution of a LSO raising an exception, the exception handler is executed and the state of the workflow instance is set to "FAILED". In the case of a workflow instance failure, the exception handler sends a status failed message 717 to the workflow state manager so that the status of the workflow instance can be updated in the fulfillment line.

A workflow instance can call multiple LSOs either sequentially or in parallel. In this example, a first LSO 728 is called at step 722 and an invocation message in the form of an XML document 724 is sent to the LSO. The first LSO transmits data request messages 730 to a data provider 732 and receives requested data messages 734 from the data provider. The LSO responds by sending the requested data messages back to the workflow instance.

The workflow instance determines if a complex search is being performed at step 738. If the search is a simple search and only the first LSO is to be called, then the workflow instance ends its search process at step 740 and transmits a status complete message 742 to the workflow state manager. If the workflow instance completed the search, a updated result XML document 764 is sent to the fulfillment line. If the workflow state manager determines that the workflow instance did not complete normally, it throws an exception 760 to the intelligent data assimilation system notifier 762.

If a complex search is requested, such as using several LSOs to query separate databases or an LSO will be collecting data from a manual process, the workflow instance invokes a second LSO 744 and sends a second semantic context message 736 in the form of a XML document to a second LSO (not shown). Clients using services from an intelligent data assimilation system may request a fulfillment to be performed within the same session as the request, as in the case of real-time searches. To facilitate this, an intelligent data assimilation system has services that are configured to process the request synchronously. For searches that cannot be immediately fulfilled (as in the case of manual searches) an intelligent data assimilation system has services that are configured to process asynchronously. An intelligent data assimilation system, therefore, has the ability to synchronize a response message to the completion of workflow and include the resulting output in a response message. When an asynchronous service is requested, an intelligent data assimilation system responds to the data client independently of the completion of the workflow with the idea that the data client will "come back later" to request the results.

A workflow instance can call other workflow instances. To do so, a workflow instance calls 746 a sub-workflow instance 750 and transmits an invocation message 748 in the form of a XML document to the sub-workflow instance. The sub-workflow instance operates independently of the workflow instance. However, the workflow instance can wait 746 for the sub-workflow instance to finish processing. The workflow instance may send an exception message in the form of an XML document 754 to the workflow instance if the sub-workflow instance encounters problems during execution. When the sub-workflow instance completes processing, the sub-workflow transmits a workflow end message 752 in the form of a XML document to the workflow instance. The workflow instance receives 756 the end workflow message and merges 758 the data included in the end workflow message into a semantic object for further processing by an intelligent data assimilation system.

Definition of a workflow can be done by directly manipulating a service metadata store or through a product configuration tool. Thus, workflow definition is achieved by defining the processing flow for LSOs included in a particular service. The intelligent data assimilation system views this as a service request that passes through a set of decisions and LSOs.

Various workflow patterns can be developed to support searches synchronously or asynchronously and to merge the resulting output into a well-defined structure. Business rules or proprietary algorithms can be applied to the search results to support the specific nature of workflow context.

The workflow engine provides support for pauses in the workflow in order to perform manual intervention. Through this capability, searches that cannot be fulfilled via automation can be performed and the resulting information returned into the workflow and merged with automated searches.

An intelligent data assimilation system provides a notification mechanism that is triggered upon completion of a workflow instance. A notification dispatcher utilizes intelligent data assimilation system services that provide e-Mail, facsimile transmission (fax), telephony, pager, DBMS Storage and JMS functionality. Client applications using the intelligent data assimilation system provide notification information as part of a service request message. An intelligent data assimilation system accepts multiple notification methods for any service request.

The e-Mail service transmits a formatted e-Mail message to an e-Mail address included in the service request message with an identification of the completed search and information on how the results can be obtained. The e-Mail service can also format the search results and include them in the e-Mail message body.

A telephony notification service provides for notification via pagers, fax, and wireless phones.

For systems that provide access to a DBMS, an intelligent data assimilation system updates database tables with values that indicate the completion of the service request.

Other systems may request notification by posting a message to a message queue topic. This is accomplished through an intelligent data assimilation system's JMS service. Clients implement a mechanism to listen for messages posted to the queue. Upon receipt of a message, the data client performs request management activities and submits output requests to the intelligent data assimilation system.

Figure 10:
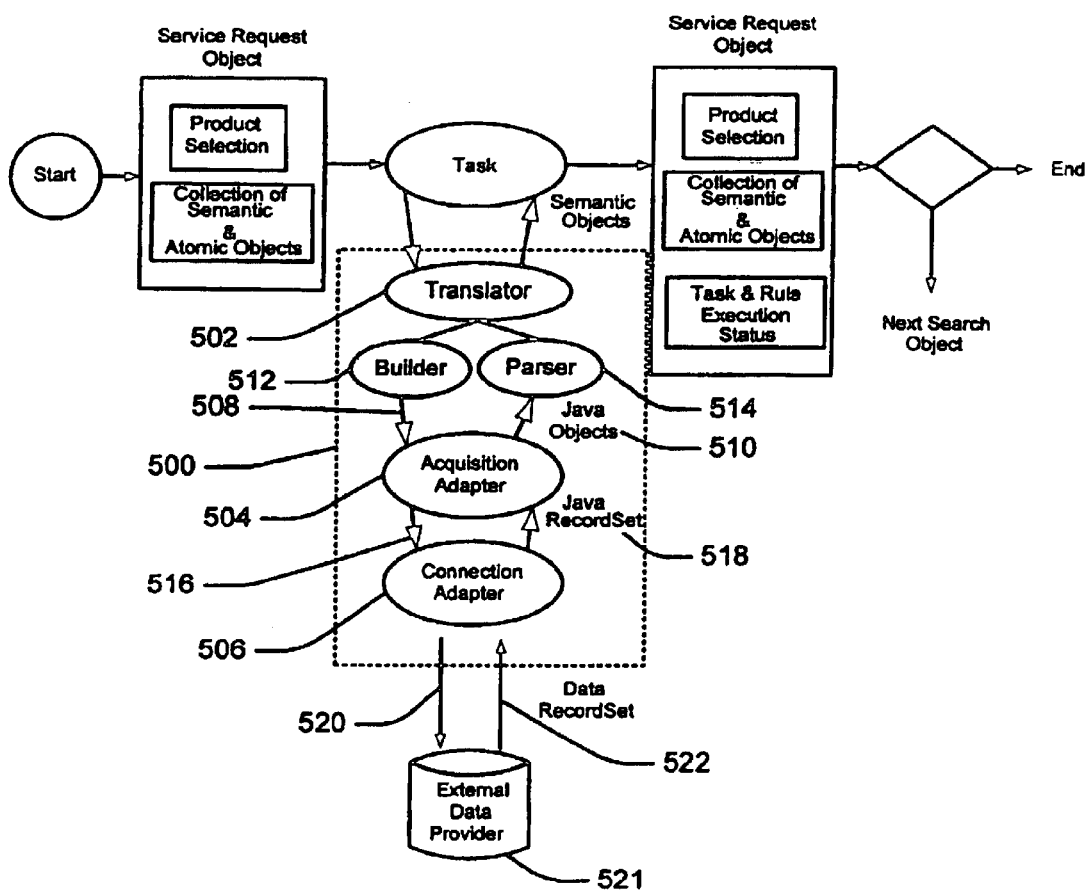
FIG. 10 depicts an exemplary embodiment of a logical search object used within a workflow according to the present invention.

FIG. 10 depicts an exemplary embodiment of a LSO used within a workflow according to the present invention. A LSO is a self contained software object including a set of components that, when combined together, encapsulate the capability to connect to a data provider, generate a knowledge instance by extracting and parsing the data returned by the data provider in response to a request, and deliver the knowledge instance into the ontology for use by the current instance of the request so that the data can be consolidated into a result set.

LSOs are reusable components and understand the various access methods to the data provider, protocols on which a search request can be made, and the translation of returned data into a knowledge instance including atomic and semantic structures used by intelligent data assimilation system. These features form a partitioning of several layers of an LSO 500: a translation layer; a data acquisition layer; and the connectivity layer. These layers are realized by software objects termed adaptors. An instantiated LSO includes a translator adaptor 502, an acquisition adaptor 504, and a connection adaptor 506.

The translation layer includes software objects that build a data request to a data provider 508 and subsequently parse the returned data stream 510. A request builder software object 512 understands how to structure the request in the manner defined by the data provider. For example, the data provider may request a Structured Query Language (SQL) statement to be sent to a database, a query string to be sent to a Uniform Resource Locator (URL), or a proprietary query protocol. A response parser software object 514 is capable of recognizing a format in which the data is being returned and translate that data into a meaningful semantic context usable by an intelligent data assimilation system and populate a run-time instance of the ontology representing the semantic and atomic objects included within the LSO. For instance, the data provider may return an SQL recordset or a character delimited text file in which case the response parser will parse the recordset or character delimited text file and generate the necessary atomic objects as specified for the LSO.

The request builder abstracts the construction of request information by building a request at the protocol level. For example, a request builder task creates content that can be immediately fed to a connection adaptor to be executed. Examples request builders are an HTTP request builder for building a request for transmission over an HTTP communications link and a Telnet request builder for transmission of a request over a Telnet communications link.

The request builder works on a semantic object to create request queries. This coupled with descriptor information creates a prepared request string. A request builder can utilize different schemes to achieve this. In an embodiment of a request builder according to the present invention, a request builder utilizes a native object and a native descriptor. The native object holds the implementation details of how a request looks to a particular protocol and data provider. The native object is thus an interface describing an object representing a native view of a search request. For example, an HTTP request builder utilizes a URL native object. The URL native object hides the details of constructing a URL query string that the HTTP protocol uses. The request builder makes use of subordinate classes that perform the work. The request builder then becomes like a container class to perform the action or a controllers.

A native descriptor includes ontology information describing a data structure. For example, if a request being sent to a data provider entails a fixed length packet, then the native descriptor includes descriptions of the data structures used to create a fixed length request. Previously described semantic descriptors are used within the native descriptor to describe the ontology information.

The response parser abstracts the parsing of a data stream from a data provider and construction of ontological objects. The response parser concentrates on the format that the data stream comes back in, not the protocol that retrieved the data stream. For example, if the data stream is character delimited, binary, positional or so on, the parser will deal with those complexities and construct atomic and semantic objects used to populate the portions of a run-time instance of an intelligent data assimilation ontology included within a LSO.

A response parser generates ontological objects such as atomic or semantic objects. To achieve this, the parser iterates through a parser descriptor's semantic descriptor discovering new data structures to be accounted for. When a new data structure is encountered, data is extracted from the data stream and an ontological object is created and added to the runtime instance of the intelligent data assimilation ontology. The parser descriptor includes ontology information describing data structures utilizing semantic descriptors. Stream and string tokenizers are also used when it is convenient to transform the data into string arrays or tokens.

The data acquisition layer includes a data acquisition adaptor software object used to conduct a search. The data acquisition adaptor manages the translation of parameters into a search request 516, supplies the request to the appropriate connectivity protocol in the connectivity layer, obtains the results 518, manages the translation of the data stream into a semantic XML structure and returns the results into the intelligent data assimilation system.

In operation, a data acquisition adaptor initializes a request builder, a response parser, and a connection adaptor. Once that happens, the adaptor has the task of interacting with each of these components in order to build a request, send a query to a data provider and parse a reply and populate an ontology with a knowledge instance generated from the reply. For example, an acquisition adaptor at initialization time generates a request builder, a response parser, and a connection adaptor. The data acquisition adaptor "builds" a request by making a method invocation on the request builder. The data acquisition adaptor takes the output from the request builder and feeds the response to the connection adaptor. When the connection adaptor returns, the output, such as an input stream, is fed into the response parser where semantic and atomic objects are made from the input stream. The semantic and atomic objects are then passed back to the LSO which populates the intelligent data assimilation ontology.

The connectivity layer includes a connection adaptor for transmitting data packets 520 and receiving data packets 522 to and from an external data provider 521 using various communication and data provider access protocols. An intelligent data assimilation system is capable of connecting to external data providers using a variety of protocols such as HTTP, various RDBMS protocols such as Oracle Net or SQL Net, and other protocols proprietary to specific data providers. The intelligent data assimilation system understands that a request via HTTP may entail that a socket be established or a request to a database may entail making particular drivers available. The connectivity layer of an LSO provides this capability. The request can then subsequently be passed to the data provider, where it is executed and search results obtained.

The connection adaptor hides transport specific headers found within a data stream. The connection adaptor also concatenates responses from a data provider. For example, if a search produces three results then the data stream returned should include the three results concatenated together.

A connection adaptor establishes a link between the connection adaptor's environment and an external data provider. For example, a connection adaptor knows the external data provider's IP address, port number, and whatever information is entailed in contacting the data provider so that data can be sent. A connection adaptor utilizes a plurality of subordinate classes to accomplish the connection adaptor's tasks. The responses from the external data provider are included in an input stream. In one embodiment of a connection adaptor according to the present invention, a connection to the data provider is setup before runtime so that the connection adaptor can send the request data to the external data provider without re-establishing a connection with the data provider for each request.

There are multiple data provider interface components oa available at each layer of the LSO, with each data provider interface component implementing specific variations of data provider interfaces. In an embodiment of an LSO according to the present invention, an LSO is implemented using. Enterprise Java Bean (EJB) wrappers providing the LSO with the ability to deploy various combinations of data provider interface components into the LSO at runtime.

Because a LSO has the LSO's configuration parameters determined at runtime, semantic objects defined in the intelligent data assimilation system ontology are not constrained by a single LSO. Thus semantic objects can straddle multiple LSOs, and have the ability that, when invoked, semantic objects are intelligent enough to connect, extract, and assimilate data from numerous disparate data providers. The ability of semantic objects to straddle multiple LSOs allows users of an intelligent data assimilation system to manipulate a single construct that represents either atomic data or an abstracted assimilation of data from a plurality of data providers.

Figure 11:
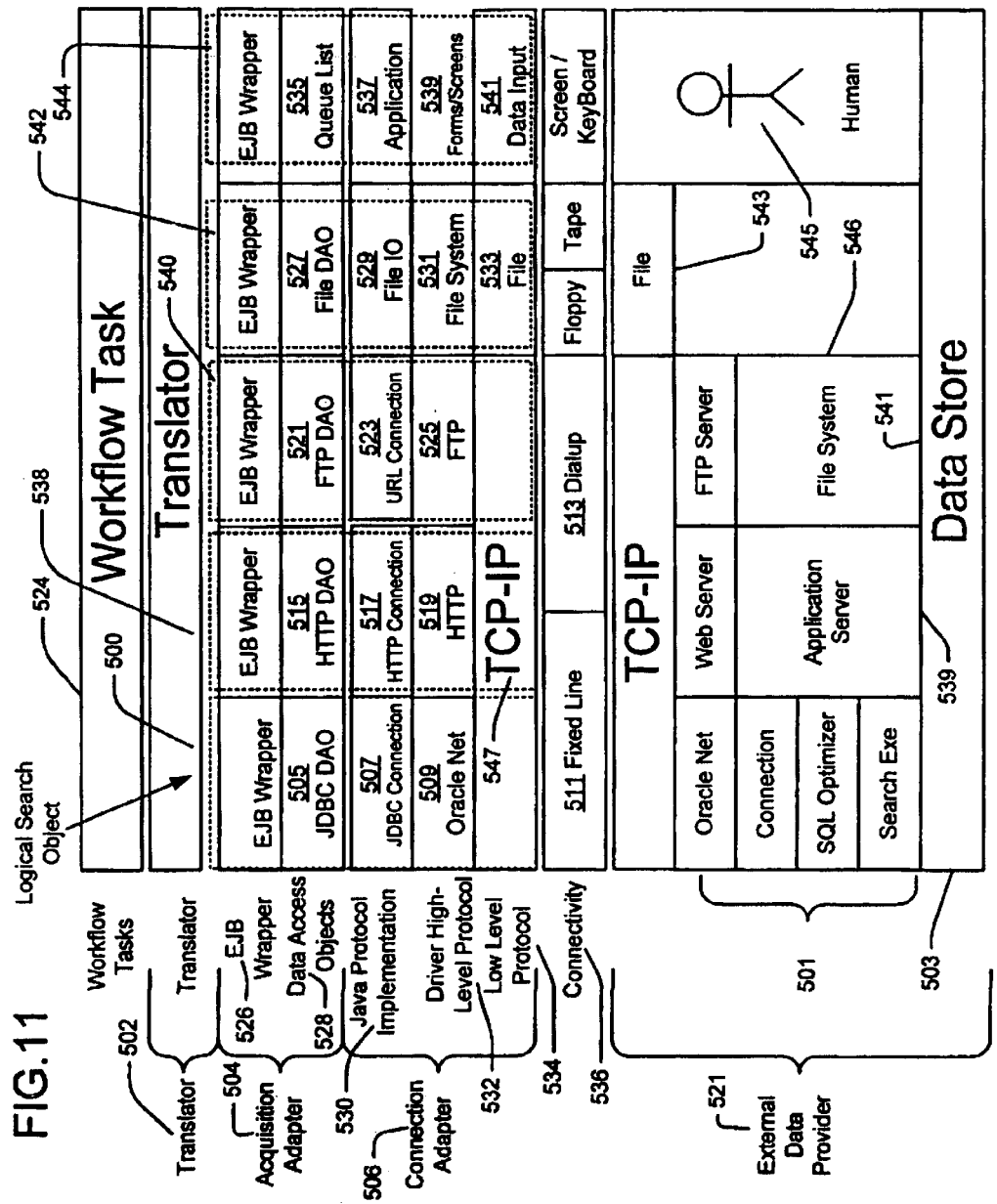
FIG. 11 is a diagram depicting the layered architecture of an embodiment of a generic logical search object according to the present invention and how this layered architecture is used to generate logical search objects with various connectivity capabilities.

FIG. 11 is a diagram depicting the layered architecture of an embodiment of a generic LSO according to the present invention and how this layered architecture is used to generate different LSOs with various connectivity capabilities. The operation between objects within the layers has been previously described in FIG. 10. As previously described, a LSO includes a translator layer 502, an acquisition adapter layer 504, and a connection adapter layer 506. As previously described, the translator layer transmits workflow task data requests down through the acquisition adapter layer, through the connection adapter layer, through the connectivity layer to the data provider. The data provider responds to the data request by accessing a data store 503 to satisfy the data request and transmits data satisfying the request to the LSO. The LSO then reformats the requested data and builds previously described semantic objects included in the ontology that are used by an intelligent data assimilation system to respond to data requests from external data clients as previously described.

In one embodiment of an LSO according to the present invention, the acquisition layer includes an EJB wrapper sub-layer 526 encapsulating previously described data access objects 528 such as a previously described request builder and response parser. The connection adapter layer includes a language specific protocol sub-layer 530 operably coupled to a high-level protocol sub-layer 532. The high-level protocol sub-layer sits atop a low-level protocol sub-layer 534.

In an embodiment of a database LSO suitable for connection to an external data provider in the form of a database 501, a database LSO 500 includes database data access objects 505 including Java DataBase Connectivity (JDBC) API to execute SQL statements, thus allowing the database LSO to interact with a SQL-compliant database. The JDBC data access objects use a JDBC connection pool 507 within the language specific protocol sub-layer and a networked database driver 509 in the high-level protocol sub-layer to connect to an external database using a physical communication medium such as a fixed network link 511 or a telephone dial-up link 513 through a TCP/IP low-level protocol sub-layer 547.

In an embodiment of a Web server LSO suitable for connection to an external data provider in the form of a Web server 539, a Web server LSO includes HTTP data access objects 515 for connection to a data provider over a communications network adapted for communications using HTTP. The HTTP data access objects use a HTTP connection pool 517 within the language specific protocol sub-layer and HTTP driver API 519 in the high-level protocol sub-layer to connect to an external Web server using a physical communication medium such as a fixed network link 511 or a telephone dial-up link 513 through a TCP/IP low-level protocol sub-layer 547.

In an embodiment of a FTP server LSO suitable for connection to an external data provider in the form of a FTP file server 541, a FTP server LSO includes FTP data access objects 521 for connection to a data provider over a communications network adapted for communications using FTP. The FTP data access objects use a FTP connection pool 523 within the language specific protocol sub-layer and FTP driver API 525 in the high-level protocol sub-layer to connect to an external FTP server using a physical communication medium such as a fixed network link 511 or a telephone dial-up link 513 through a TCP/IP low-level protocol sub-layer 547.

In an embodiment of a file LSO suitable for connection to an external data provider in the form of a file system 543, a file server LSO includes file data access objects 521 for connection to a data provider's file system. The file data access objects use file I/O API 523 within the language specific protocol sub-layer and file system API 525 in the high-level protocol sub-layer to connect to a file system 543 stored on a physical medium such as a floppy disk 551 or magnetic tape 553.

In an embodiment of a manual entry LSO a suitable for connection to an external data provider in the form of a human actor 545, a manual entry LSO includes que list data access objects 521 for management of the manual entry data. The manual entry access objects use an application 537 within the language specific protocol sub-layer and a user interface in the form of forms and screens 539 in the high-level protocol sub-layer to connect to a human actor 545 through a manual entry input device such as a screen and keyboard 549.

An application server provides an interface with an intelligent data assimilation system by accepting service requests from external systems and responding with fulfilled service requests. An application server is also that process that ensures all service requests received by the intelligent data assimilation system are reliably executed. An application server accepts numerous service requests that either request an informational response about the state or information managed by the intelligent data assimilation system or service requests to initiate a service request by instantiating a workflow. While the workflow mechanism supports the ability to create automated workflows including a plurality LSOs without any manual intervention, the workflow mechanism also supports the ability to suspend a workflow and allow for a manual process to occur that will provide data back into the system and then resume the workflow execution.

Service requests are submitted to an intelligent data assimilation system through the intelligent data assimilation system's exposed API. These service requests are fulfilled against different data providers. Once the service request is fulfilled, the intelligent data assimilation system will optionally host the result until it is requested by the specific system that submitted the service request. Search results can remain in the intelligent data assimilation system for a configurable period of time.

The intelligent data assimilation system API structure is built upon the ability to accept XML messages via a variety of transport mechanisms. In one embodiment of an intelligent data assimilation system according to the present invention, the intelligent data assimilation system's processing tier handles the following transports:

Java Messaging Service (JMS)

Hyper Text Transfer Protocol (HTTP)

Remote Message Interface (RMI)

Simple Mail Transfer Protocol (SMTP)

The processing tier accepts documents sent according to each of the transport protocols. Each of the documents includes a XML document including a service request. The intelligent data assimilation system provides an EJB wrapper to various intelligent data assimilation system proxies that provide an interface to build XML messages and send the XML messages via the requested transport. Configuring a deployment descriptor file sets the transport method utilized by the wrapper component.

A data client accessing an intelligent data assimilation system's services can choose to use the wrapper component to facilitate the building and sending of messages or may alternatively choose to communicate directly to the intelligent data assimilation system proxy.

Each message sent to the logical search object application server results in obtaining a response from the intelligent data assimilation system coupled to the intelligent data assimilation system. The type of response depends on the kind of submitted message. In one embodiment of an intelligent data assimilation system according to the present invention, the messages used include: a service request, a status request, a service information request, and a cancellation request. In this embodiment of an intelligent data assimilation system, the messages are transmitted to the intelligent data assimilation system by a data client as an XML document.

Each message includes an outer message wrapper including attributes which help identify the type of a message, the source of a message, and the uniqueness of a message from the perspective of a data client.

The basic message elements are described in the following table:

| | |
|---|---|
| message | Element which wraps the entire intelligent data assimilation system Message. |
| message#client-id | Attribute which includes the data client identifier which identifies the sender of the message. |
| message#type | Attribute which includes the type of the intelligent data assimilation system message. |
| data | Element including the data of the message. |

A service request message initiates a request for service in an intelligent data assimilation system. The service request message includes two outer elements 'message' and 'data'. The 'message' element includes attributes to identify the origin and type of message.

The 'data' element includes information about what services have been requested. A service request may include one or many requests for service, with one by the 'product' element for each request. The product element includes a number of attributes indicating which services have been requested. Inside the 'product' element there may be multiple tags indicating parameters for the request, formatting options and notification options.

The following table includes a description of the elements in a service request message:

| | |
|---|---|
| service-request | Element which wraps the individual service requests. |
| service-request#message-id | A unique identifier used to identify this request message. |
| service-item | Element which represents an individual service request item. |
| service-item#sku | An identifier indicating which service has been requested. |
| service-item#item | An identifier used to differentiate between service requests in the same message |
| parameter | Element to represent a parameter. |
| parameter#name | The name of the parameter. |
| parameter#value | The value of the parameter |
| notification | Element indicating a notification option. May include any number of parameter elements |
| notification#type | attribute indicating the type of notification requested. |
| format | Element indicating a formatting option to be used for this element. If it is within a notification block applies only to the notifier. |
| format#style | The stylesheet to used to format the notification. |
| result-format | Element which includes options relating to the final output of the message. Includes format element described earlier. |
| results | Element which the workflow uses to populate the result data. |

Referring now to FIG. 14, an exemplary XML document service request message 1100 is shown. The exemplary XML document service request message includes an outer message element 1101 and an inner data element 1102 as previously described. Included in the data element is a service-request element 1104 including a service-item element 1106. The service-item element includes two parameter elements, 1108 and 1110, defining a first and last name as part of the search request. The data element further includes a notification element 1112 specifying the type of notification to be used to notify the data client when a data product resulting from the service request is ready. The data element further includes a result-format element for specifying the format of the data product 1114. A results element is included in the data element as a place holder for the resulting data product to be sent to the data client in response to the service request.

A status request message is a request for an intelligent data assimilation system to provide status information for a previously sent service request.

The following table includes a description of the elements in a status request message:

| | |
|---|---|
| status | Element which wraps the individual status requests. |
| status#message-id | A unique identifier used to identify this status message. |
| status-request | Element which represents a individual status request item. |
| status-request#item | An identifier used to differentiate between status requests in the same message |
| IDAS-id | The identifier of the intelligent data assimilation system request the data client wants status information for |

FIG. 15 is an, XML document embodiment of an exemplary status message according to the present invention. A message element 1118 includes a data element 1120 as previously described. The message element includes a type attribute 1119 indicating that this is a status message. The data element includes a status element 1122 which includes a plurality of status-request elements 1124, each with its own item and identifier attributes.

A cancel request message is a request for an intelligent data assimilation system to stop processing a previous service request. It is possible that before an intelligent data assimilation system has a chance to process the cancel request message, the processes to be cancelled may have already completed.

The following table includes a description of the elements in a cancel request message:

| | |
|---|---|
| cancel | Element which wraps the individual cancel requests. |
| cancel #message-id | A unique identifier used to identify this cancel message. |
| cancel-request | Element which represents a individual cancel request item. |
| cancel-request#item | An identifier used to differentiate between cancel requests in the same message |
| idas-id | The identifier of the intelligent data assimilation system request a data client is cancelling. |

FIG. 16 is an XML document embodiment of an exemplary cancel message according to the present invention. The XML document embodiment of an exemplary cancel message includes a previously described message element 1126 including a previously described data element 1128. The type attribute of the message element is "Cancel" 1127 indicating that this is a cancel message. The data element includes a cancel element 1130 which includes a plurality of cancel request elements 1132.

An output message is transmitted by a data client to an intelligent data assimilation system to request the results of a previously transmitted service request. The following table includes a description of the elements in an output request message:

| | |
|---|---|
| output | Element which wraps the individual output requests. |
| output#message-id | A unique identifier used to identify this output message. |
| output-request | Element which represents a individual output request item. |
| output-request#item | An identifier used to differentiate between output requests in the same message |
| idas-id | The identifier of the intelligent data assimilation system process you wish to retrieve data from. |
| format | Element indicating a formatting option to be used. |
| format#style | The XML stylesheet to used to format the output. |

FIG. 17 is an XML document embodiment of an exemplary output message according to the present invention. The XML document embodiment of an exemplary output message includes a message element 1134 including a data element 1136 as previously described. The data element includes an output element 1138 including an output-request element. The output-request element includes an identifier attribute 1141 identifying the service request for which a data client requests a result. A format element 1142 specifies the format of the requested data using a style attribute 1144.

A response message represents a response given to a request to the intelligent data assimilation system if the request is correctly structured and formatted. The response includes product data, search results data or status data. It also includes indicators whether the request was successful or not.

The following table includes a description of the elements in a response message:

| | |
|---|---|
| message-type | Indicates the message type. For a response message this is always 'Response'. |
| service-response-message-id | A unique identifier used to identify the message that this is a response to. |
| response-item | The line-id from the request message that this response is for. |
| result | Attribute indicating a disposition of a response such as 'Success' or 'Error'. |
| request | A type of the request we are responding to. |
| idas-id | An identifier of an intelligent data assimilation system process that a response is about. |
| response-value | A freeform tag which includes the response data for that particular response. |
| data | no attributes defined. |

FIG. 18 is an XML document embodiment of an exemplary response message according to the present invention. The XML document embodiment of an exemplary response message includes a previously described message element 1146 including a previously described data element 1148. The message element includes a type attribute 1149 indicating that the message is a response message. The data element includes a service-response element 1150 including a response element 1152. The response element includes a response-value element 1154 which indicates the date and time that a workflow task was instantiated to satisfy a subject service request.

A selection message includes the response to a user selection. It is issued when a user makes a selection from a list of options, and the message encapsulates the result.

The following table includes a description of the elements in a selection message:

| | |
|---|---|
| selection-results | element which includes the selection results data. |
| selection-results#message-id | Attribute which includes the message identifier. |
| additional-data-item | element including an individual selection result. |
| additional-data-item#item | attribute representing the item number. |
| additional-data-item#idas-id | The intelligent data assimilation system identifier which the selection refers to. |
| selected | element which represents a selected options. |
| selected#item | attribute which give the item which was selected. |

A product information message is used to request information about one or more services provided by the intelligent data assimilation system. A response to a product information message includes information describing the service, available formatting options, an intelligent data assimilation system ontology used for the input parameters and the intelligent data assimilation system ontology for the expected output.

In an embodiment of an intelligent data assimilation system according to the present invention, data clients access the services of the intelligent data assimilation system via an application server. The application server provides a consistent interface for communications with data clients over a variety of communication networks. The application server receives search request messages from data clients via a plurality of communication networks, translates the search request messages into a consistent internal format for use by the intelligent data assimilation system, and coordinates the transmission of responses to the data clients via the communication networks.

Figure 12:
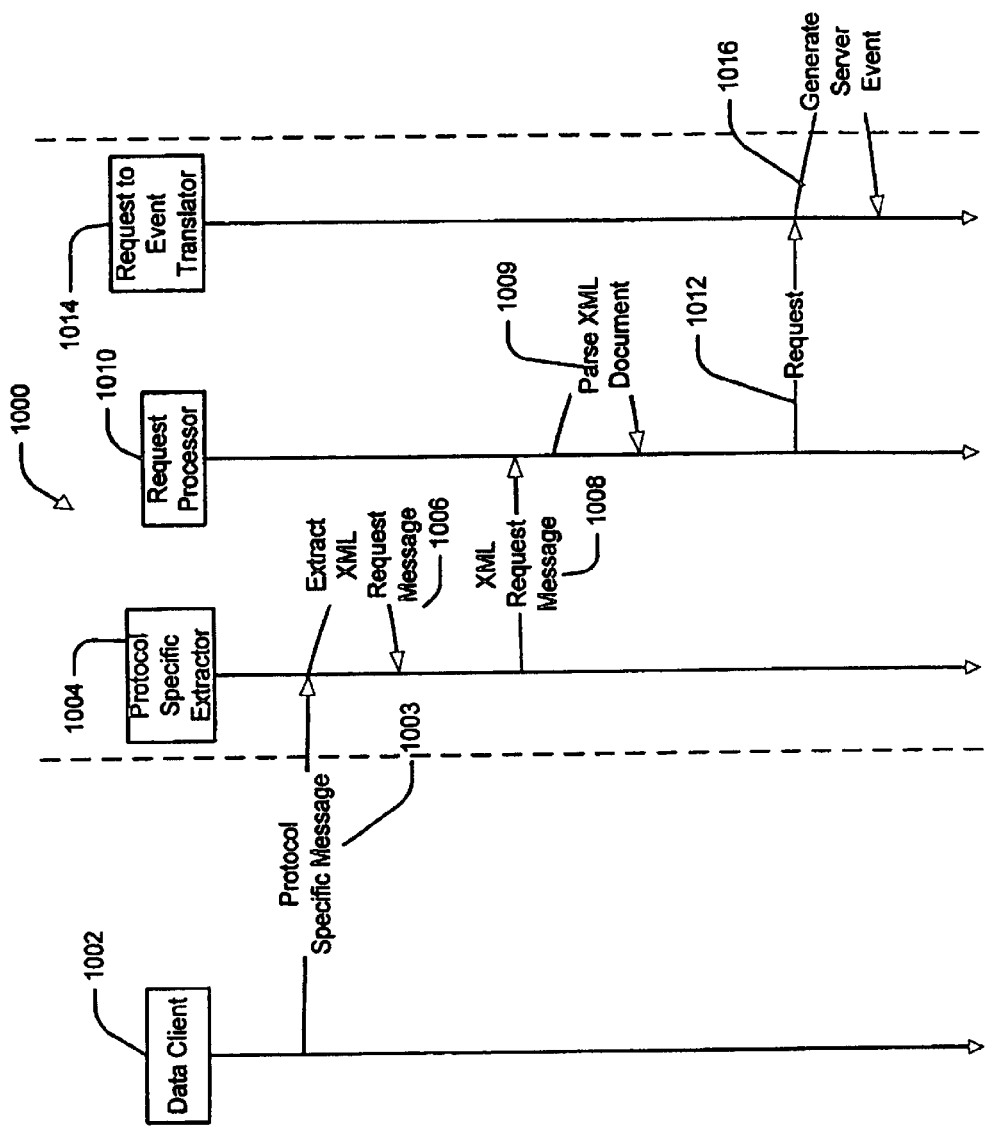
FIG. 12 is a sequence diagram illustrating the sequence of events that occur when a request message is received by an embodiment of an intelligent data assimilation system according to the present invention.

FIG. 12 is a sequence diagram illustrating the sequence of events that occur when a request message is received by an embodiment of an application server according to the present invention. An application server includes a processing tier 1000 and a server tier (not shown). The processing tier includes a protocol specific message extractor 1004, a request processor 1010, and a request to event translator 1014. A data client transmits 1002 a protocol specific message 1003 including a previously described request message in the form of a XML document. For example, the data client might be a Web browser and the protocol specific message might be a post transmitted via the Internet using HTTP. In one embodiment of a processing tier according to the present invention, the supported protocols include HTTP, SMTP, RMI, and JMS.

The protocol specific message is received by a protocol specific extractor 1004 and the protocol specific extractor extracts 1006 the embedded XML document request message 1008. The XML document request message is transmitted to a request processor 1010. The request processor parses 1009 the XML document request message and extracts attributes in order to determine the class of event handler to be instantiated. The request handler then creates the event handler with the extracted attributes and the XML document request message. The XML document request message 1012 then propagates up to the server tier where it is broken into various components 1016 for the workflow by the request to event translator.

Figure 13:
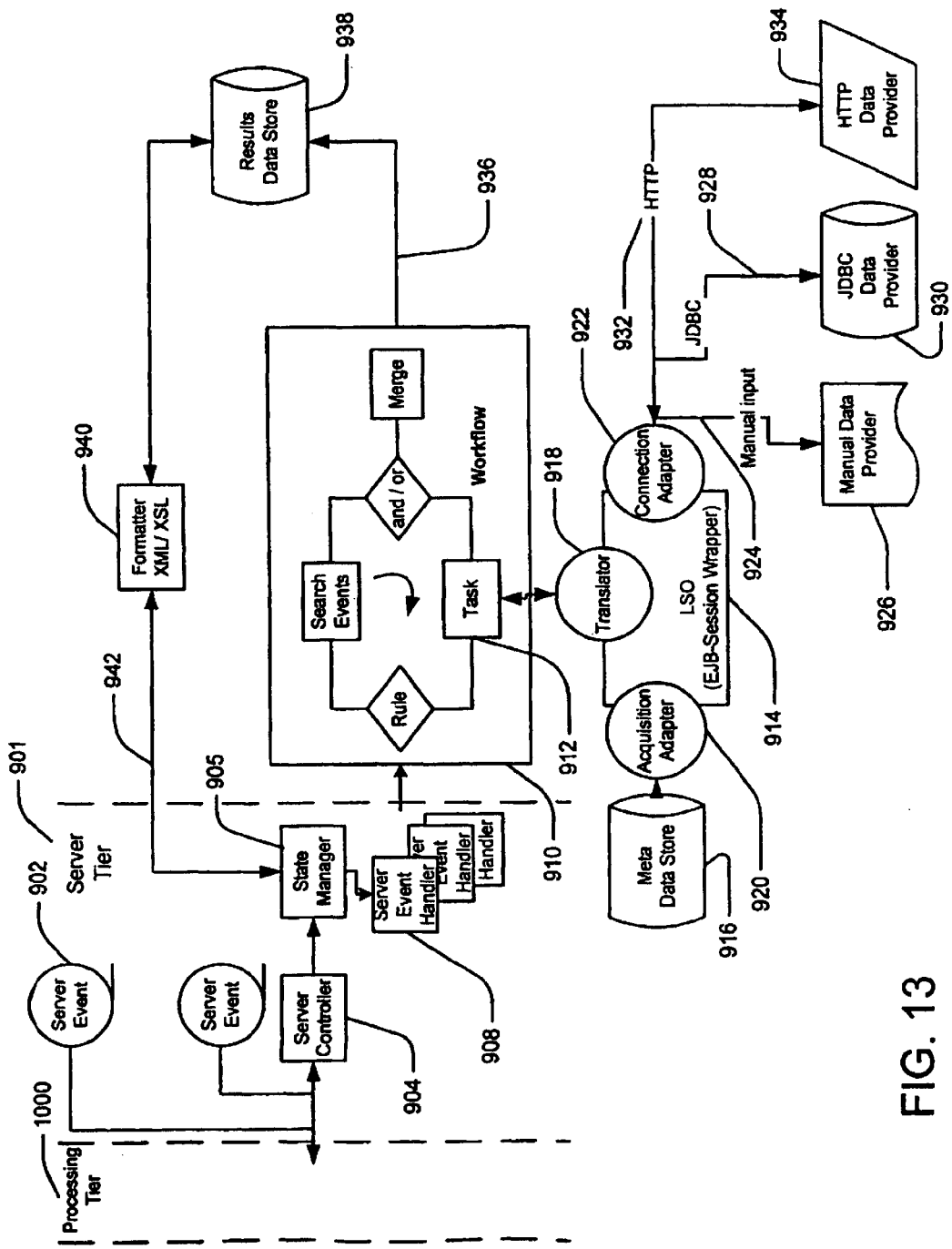
FIG. 13 illustrates an intelligent data assimilation system employing logical search objects according to the present invention.

FIG. 13 illustrates how an embodiment of an intelligent data assimilation system is coupled to a according to the present invention. An application server includes a server tier including a server controller for controlling the operations of the intelligent data assimilation system. Operations within an intelligent data assimilation system are initiated by a plurality of server events 902 generated within the previously described processing tier 1000 in response to request messages transmitted to the application server by a data client. A state manager 905 coordinates the actions of a plurality of server event handlers 908 responding to the plurality of server events. The server event handlers in turn use the services of the previously described workflow engine 910 to create a instances of previously described workflows. The workflows include a task node 912 that invokes a previously described LSO 914. The properties of the LSO are defined by a set of previously described descriptors stored in the previously described metadata store 916. The LSO includes a previously described translator 918 for interfacing with the workflow task and a previously described acquisition adapter for building queries and parsing responses, and a previously described connection adapter 922 for connection to an external data provider.

The LSO makes a connection to an external data provider such as data providers 926, 930, and 934 using an appropriate communications link such as communications links 924, 928, and 932 as previously described. The LSO collects a data set and creates a semantic object encapsulating the data set as previously described. The workflow uses the semantic object to transmit a data result to results data store 938.

The intelligent data assimilation system manages the data results in XML format in the results data store. A product definition identifies the duration that the data result will remain in the results data store. Data results that persist in the intelligent data assimilation system can be used for archival purposes. The data result is rendered into an appropriate format for transmission to the data client using XSL stylesheets by the formatter 940 according to a format tag included in the request message. The server controller receives the rendered data result from the formatter and transmits the rendered data result 942 to the data client as a response to the data client's service request message.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by claims supported by this application and the claim's equivalents rather than the foregoing description.

What is claimed is:

1. A method of fulfilling a data service request, the method comprising:
providing an ontology description of a data service, wherein the ontology description of the data service comprises a semantic description of atomic objects associated with the data service; providing a first workflow;
providing a plurality of logical search objects operably coupled via a respective one of a plurality of communications links to a respective one of a plurality of data providers and operably coupled to the first workflow;
transmitting by the logical search objects to the data providers via the communications links a plurality of search requests, the search requests generated by the first workflow from the data service request;
receiving by the logical search objects from the data providers via the communications link a plurality of data sets in response to the search requests;
transmitting by the logical search objects to the first workflow the data sets; and generating by the first workflow a knowledge instance from the data sets using the ontology description of the data service.

2. The method of claim 1 wherein at least one of the communications links is adapted for communications with a database server.

3. The method of claim 1 wherein at least one of the communications links is adapted for communications with a FTP server.

4. The method of claim 1 wherein at least one of the communications links is adapted for communications with a Web server.

5. The method of claim 1 wherein at least one of the communications links is adapted for communications with a file system.

6. The method of claim 1 wherein at least one of the communications links is adapted for communication with a human data provider.

7. The method of claim 1 wherein at least one of the communications links is adapted for communication with a communications protocol proprietary to the data provider.

8. The method of claim 1 wherein the data service request is included in a XML document.

9. The method of claim 1, further comprising:
providing an application server operably coupling a data client to the first workflow via a service request communications link, and
receiving by the application server from the data client via the service request communications link a data service request message, the data service request message including the data service request;
transmitting by the application server to the first workflow the data service request message; and
transmitting by the first workflow to at least one of the logical search objects the data service request message.

10. The method of claim 9, wherein the service request communications link is adapted for communications using SMTP.

11. The method of claim 9, wherein the service request communications link is adapted for communications using JMS.

12. The method of claim 9, wherein the service request communications link is adapted for communications using HTTP.

13. The method of claim 9, wherein the service request communications link is adapted for communications using RMI.

14. The method of claim 9, wherein the first workflow is specified by the application server using the service request message.

15. The method of claim 9 further comprising:
providing a formatter; and
formatting by the formatter the data set encapsulated in the knowledge instance into a format requested by the data client.

16. The method of claim 1 further comprising providing a second workflow operably coupled to the first workflow.

17. The method of claim 1, wherein the logical search objects are specified by the first workflow.

18. A method for accessing by a software object a data provider via a communications link, comprising:
   receiving by the software object from a second software object a search request message document;
   generating by the software object a data request for the data provider from the search request message document;
   transmitting by the software object to the data provider the data request via the communications link;
   receiving by the software object from the data provider a data set via the communications link; and
   generating by the software object a semantic object from the data set, including:
      providing a parser adaptor operably coupled to the software object;
      providing a parser semantic description of the data set for use by the parser adaptor;
      providing a semantic object semantic description;
      generating by the parser adaptor extracted data from the data set using the parser semantic description; and
      generating by the parser adaptor the semantic object using the extracted data according to the semantic object semantic description.

19. A method for accessing by a software object a data provider via a communications link, comprising:
   receiving by the software object from a second software object a search request message document;
   generating by the software object a data request for the data provider from the search request message document, including:
      providing a request builder operably coupled to the software object;
      providing a native object operably coupled to the request builder, the native object encapsulating implementation details of a data request for the data provider;
      providing a native semantic description including ontology information describing a data structure used by the request builder to build the data request for the data provider;
      transmitting by the request builder to the native object the search request; and
      generating by the native object the data request from the search request using the native semantic description;
   transmitting by the software object to the data provider the data request via the communications link;
   receiving by the software object from the data provider a data set via the communications link; and
   generating by the software object a semantic object from the data set.

20. A data processing object system adapted to fulfill a data service request, comprising:
   a processor; and
   a memory operabiy coupled to the processor and having program instructions stored therein, the processor being operable to execute the program instructions, the program instructions including:
      providing an ontology description of a data service, wherein the ontology description of the data service comprises a semantic description of atomic objects associated with the data service;
      providing a first workflow;
      providing a plurality of logical search objects operably coupled via a respective one of a plurality of communications links to a respective one of a plurality of data providers and operably coupled to the first workflow;
      transmitting by the logical data providers via the communications links a plurality of search requests, the search requests generated by the first workflow from the data service search objects to the description request;
      receiving by the logical search objects from the data providers via the communications link a plurality of data sets in response to the search requests;
      transmitting by the logical search objects to the first workflow the data sets; and
      generating by the first workflow a knowledge instance from the data sets using the ontology description of the data service.

21. The data processing system of claim 20 at least one of the communications links is adapted for communications with a database server.

22. The data processing system of claim 20 wherein at least one of the communications links is adapted for communications with a FTP server.

23. The data processing system of claim 20 wherein at least one of the communications links is adapted for communications with a Web server.

24. The data processing system of claim 20 wherein at least one of the communications links is adapted for communications with a file system.

25. The data processing system of claim 20 wherein at least one of the communications links is adapted for communication with a human data provider.

26. The data processing system of claim 20 wherein at least one of the communications links is adapted for communication with a communications protocol proprietary to the data provider.

27. The data processing system of claim 20 wherein the data service request is included in a XML document.

28. The data processing system of claim 20, the program instructions further including:
   providing an application server operably coupling a data client to the first workflow via a service request communications link, and
   receiving by the application server from the data client via the service request communications link a data service request message, the data service request message including the data service request;
   transmitting by the application server to the first workflow the data service request message; and
   transmitting by the first workflow to at least one of the logical search objects the data service request message.

29. The data processing system of claim 28, wherein the service request communications link is adapted for communications using SMTP.

30. The data processing system of claim 28, wherein the service request communications link is adapted for communications using JMS.

31. The data processing system of claim 28, wherein the service request communications link, is adapted for communications using HTTP.

32. The data processing system of claim 28, wherein the service request communications line is adapted for communications using RMI.

33. The data processing system of claim 28, wherein the logical search objects are specified by the first workflow.

34. The data processing system of claim 28, wherein the first workflow is specified by the application server using the service request message.

35. The data processing system of claim 28, the program instructions further including:
providing a formatter; and
formatting by the formatter the data set encapsulated in the knowledge instance into a format requested by the data client.

36. The data processing system of claim 28, the program instructions further including providing a second workflow operably coupled to the first workflow.

37. A data processing system adapted to access a data provider via a communications link, comprising:
a processor; and
a memory operably coupled to the processor and having program instructions stored therein, the processor being operable to execute the program instructions, the program instructions including:
receiving by a software object a search request message document;
generating by the software object a data request for the data provider from the search request message document;
transmitting by the software object to the data provider the data request via the communications link;
receiving by the software object from the data provider a data set via the communications link; and
generating by the software object a semantic object from the data set, including:
providing a parser adaptor operably coupled to the software object;
providing a parser semantic description of the data set for use by the parser adaptor;
providing a semantic object semantic description;
generating by the parser adaptor extracted data, from the data set using the parser semantic description; and
generating by the parser adaptor the semantic object using the extracted data according to the semantic object semantic description.

38. A data processing system adapted to access a data provider via a communications link, comprising:
a processor; and
a memory operably coupled to the processor and having program instructions stored therein, the processor being operable to execute the program instructions, the program instructions including:
receiving by a software object a search request message document;
generating by the software object a data request for the data provider from the search request message document, including:
providing a request builder operably coupled to the software object;
providing a native object operably coupled to the request builder, the native object encapsulating implementation details of a data request for the data provider;
providing a native semantic description including ontology information describing a data structure used by the request builder to build the data request for the data provider;
transmitting by the request builder to the native object the search request; and
generating by the native object the data request from the search request using the native semantic description;
transmitting by the software object to the data provider the data request via the communications link;
receiving by the software object from the data provider a data set via the communications link; and
generating by the software object a semantic object from the data set.

39. A computer readable media embodying program instructions for execution by a computer, the computer program instructions adapting a computer to fulfill a data service request, the program instructions comprising:
providing an ontology description of a data service, wherein the ontology description of the data service comprises a semantic description of atomic objects associated with the data service;
providing a first workflow;
providing a plurality of logical search object a operably coupled via a respective one of a plurality of communications links to a respective one of a plurality of data providers and operably coupled to the first workflow;
transmitting by the logical search objects to the data providers via the communications links a plurality of search requests the search requests generated by the first workflow from the data service request;
receiving by the logical search objects from the data providers via the communications link a plurality of data sets in response to the search requests;
transmitting by the logical search objects to the first workflow the data sets; and
generating by first workflow a knowledge instance from the data sets using the ontology description of the service.

40. The computer readable media of claim 39 wherein at least one of the communications links is adapted for communications with a database server.

41. The computer readable media of claim 39 wherein at least one of the communications links is adapted for communications with a FTP server.

42. The computer readable media of claim 39 wherein at least one of the communications links is adapted for communications with a Web server.

43. The computer readable media of aim 39 wherein at least one of the communications links is adapted for communications with a file system.

44. The computer readable media of claim 39 wherein at least one of the communications links is adapted for communication with a human data provider.

45. The computer readable media of claim 39 wherein at least one of the communications links is adapted for communication with a communications protocol proprietary to the data provider.

46. The computer readable media of claim 39 wherein the data service request is included in a XML document.

47. The computer readable media of claim 39, the program instructions further comprising:
providing an application server operably coupling a data client to the first workflow via a service request communications link, and
receiving, by the application server from the data client via the service request communications link a data service request message, the data service request message including the data service request;
transmitting by the application server to the first workflow the data service request message; and
transmitting by the first workflow to at least one of the logical search objects the data service request message.

48. The computer readable media of claim 47 wherein the service request communications link is adapted for communications using SMTP.

49. The computer readable media of claim 47 wherein the service request communications link is adapted for communications using JMS.

50. The computer readable media of claim 47 wherein the service request communications link is adapted for communications using HTTP.

51. The computer readable media of claim 47 wherein the service request communications link is adapted for communications using RMI.

52. The computer readable media of claim 47, wherein at least one of the logical search objects is specified by the first workflow.

53. The computer readable media of claim 47, wherein the first workflow is specified by the application server using the service request message.

54. The computer readable media of claim 47, the program instructions further comprising:
providing a formatter; and
formatting by the formatter the data set encapsulated in the knowledge instance into a format requested by the data client.

55. The computer readable media of claim 47, the program instructions further comprising providing a second workflow operably coupled to the first workflow.

56. A computer readable media embodying program instructions for execution by a computer, the computer program instructions adapting a computer to access a data provider via a communications link, the program instructions comprising:
receiving by a software object a search request message document;
generating by the software object a data request for the data provider from the search request message document;
transmitting by the software object to the data provider the data request via the communications link;
receiving by the software object from the data provider a data set via the communications link; and
generating by the software object a semantic object from the data set, including:
providing a parser adaptor operably coupled to the software object;
providing a parser semantic description of the data set for use by the parser adaptor;
providing a semantic object semantic description;
generating by the parser adaptor extracted data from the data set using the parser semantic description; and
generating by the parser adaptor the semantic object using the extracted data according to the semantic object semantic description.

57. A computer readable media embodying program instructions for execution by a computer, the computer program instructions adapting a computer to access a data provider via a communications link, the program instructions comprising:
receiving by a software object a search request message document;
generating by the software object a data request for the data provider from the search request message document;
providing a request builder operably coupled to the software object;
providing a native object operably coupled to the request builder, the native object encapsulating implementation details of a data request for the data provider;
providing a native semantic description including ontology information describing a data structure used by the request builder to build the data request for the data provider;
transmitting by the request builder to the native object the search request; and
generating by the native object the data request from the search request using the native semantic description.
transmitting by the software object to the data provider the data request via the communications link;
receiving by the software object from the data provider a data set via the communications link; and
generating by the software object a semantic object from the data set.

58. A method of building a knowledge instance for a data service, comprising:
providing a plurality of logical search objects, each logical search object operable to retrieve a data set from one or more data providers;
instantiating by a first workflow one or more logical search objects selected from the plurality of logical search objects;
receiving by the one or more logical search objects data sets from the one or more data providers;
transmitting by the one or more logical search objects to the workflow the data sets; and
generating by the workflow the knowledge instance from the data seta using an ontology description of a data service, wherein the ontology description of the data service comprises a semantic description of atomic objects associated with the data service.

59. The method of claim 58, wherein at least one of the data providers is a database server.

60. The method of claim 58, wherein at least one of the data providers is a FTP server.

61. The method of claim 58, wherein at least one of the data providers is a Web server.

62. The method of claim 58, wherein at least one of the data providers is a file system.

63. The method of claim 58, wherein at least one of the data providers is a human data provider.

64. The method of claim 58 wherein at least one of the logical search objects is coupled to at least one data provider via a communications link adapted for communications using a communications protocol proprietary to the data provider.

65. The method of claim 58 further comprising providing a second workflow operably coupled to the first workflow.

66. The method of claim 58, further comprising:
providing an application server operably coupling a data client to the first workflow via a service request communications link, and
receiving by the application server from the data client via the service request communications link a data service request message, the data service request message including a data service request;
transmitting by the application server to the first workflow the data service request message; and
transmitting by the first workflow to at least one of the logical search objects the data service request message.

67. The method of claim 66, wherein the first workflow is specified by the application server using the service request message.

68. The method of claim 66, further comprising:

providing a formatter; and formatting by the formatter the knowledge instance into a format requested by the data client.

69. The method of claim 66, wherein the service request communications link is adapted for communications using SMTP.

70. The method of claim 66, wherein the service request communications link is adapted for communications using JMS.

71. The method of claim 66, wherein the service request communications link is adapted for communications using HTTP.

72. The method of claim 66, wherein the service request communications link is adapted for communications using RMI.

73. A data processing system adapted to build a knowledge instance for a data service, comprising:

a processor; and a memory operably coupled to the processor and having program instructions stored therein, the processor being operable to execute the program instructions, the program instructions including:

providing a plurality of logical search objects, each logical search object operable to retrieve a data set from one or more data providers;

instantiating by a first workflow one or more logical search objects selected from the plurality of logical search objects;

receiving by the one or more logical search objects data sets from the one or more data providers;

transmitting by the one or more logical search objects to the workflow the data sets; and generating by the workflow the knowledge instance from the data seta using an ontology description of a data service, wherein the ontology description of the data service comprises a semantic description of atomic objects associated with the data service.

74. The data processing system of claim 73, wherein at least one of the data providers is a database server.

75. The data processing system of claim 73, wherein at least one of the data providers is a FTP server.

76. The data processing system of claim 73, wherein at least one of the data providers is a Web server.

77. The data processing system of claim 73, wherein at least one of the data providers is a file system.

78. The data processing system of claim 73, wherein at least one of the data providers is a human data provider.

79. The data processing system of claim 73, wherein at least one of the logical search objects is coupled to at least one data provider via a communications link adapted for communications using a communications protocol proprietary to the data provider.

80. The data processing system of claim 73, the program instructions further including providing a second workflow operably coupled to the first workflow.

81. The data processing system of claim 77, the program instructions further including:

providing an application server operably coupling a data client to the first workflow via a service request communications link, and receiving by the application server from the data client via the service request communications link a data service request message, the data service request message including a data service request;

transmitting by the application server to the first workflow the data service request message; and transmitting by the first workflow to at least one of the logical search objects the data service request message.

82. The data processing system of claim 81, wherein the first workflow is specified by the application server using the service request message.

83. The data processing system of claim 81, further comprising:

providing a formatter; and formatting by the formatter the knowledge instance into a format requested by the data client.

84. The data processing system of claim 81, wherein the service request communications link is adapted for communications using SMTP.

85. The data processing system of claim 81, wherein the service request communications link is adapted for communications using JMS.

86. The data processing system of claim 81, wherein the service request communications link is adapted for communications using HTTP.

87. The data processing system of claim 81, wherein the service request communications link is adapted for communications using RMI.

* * * * *